US009481226B2

(12) United States Patent
Osaka et al.

(10) Patent No.: US 9,481,226 B2
(45) Date of Patent: Nov. 1, 2016

(54) VEHICULAR AIR-CONDITIONING SYSTEM INCLUDING A TEMPERATURE-DEPENDENT CONTROL CYCLE

(75) Inventors: Tadashi Osaka, Kashiwa (JP); Hiroaki Matsushima, Souraku-gun (JP); Sachio Sekiya, Hitachinaka (JP); Riichi Uchida, Kasama (JP); Yuki Akiyama, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 410 days.

(21) Appl. No.: 13/982,902

(22) PCT Filed: Feb. 21, 2011

(86) PCT No.: PCT/JP2011/053684
§ 371 (c)(1),
(2), (4) Date: Jul. 31, 2013

(87) PCT Pub. No.: WO2012/114427
PCT Pub. Date: Aug. 30, 2012

(65) Prior Publication Data
US 2013/0306302 A1 Nov. 21, 2013

(51) Int. Cl.
*F25D 17/00* (2006.01)
*B60H 1/00* (2006.01)

(52) U.S. Cl.
CPC ...... *B60H 1/00642* (2013.01); *B60H 1/00385* (2013.01)

(58) Field of Classification Search
CPC .................. B60H 1/00385; B60H 1/00642
USPC .......................................................... 62/190
See application file for complete search history.

(56) References Cited

U.S. PATENT DOCUMENTS

| | | | | |
|---|---|---|---|---|
| 5,215,044 | A * | 6/1993 | Banzhaf | F01P 1/00 123/41.05 |
| 6,047,770 | A * | 4/2000 | Suzuki | B60H 1/00007 165/202 |
| 2006/0201164 | A1* | 9/2006 | Fickel | F02M 21/06 62/50.2 |
| 2008/0092564 | A1* | 4/2008 | Sulc | B60P 3/20 62/90 |
| 2008/0141691 | A1* | 6/2008 | Hirota | B60H 1/00571 62/190 |
| 2009/0130513 | A1* | 5/2009 | Tsuchiya | B60H 1/00385 429/412 |
| 2010/0000713 | A1 | 1/2010 | Takahashi et al. | |
| 2011/0073667 | A1* | 3/2011 | Flick | B60H 1/00385 236/51 |
| 2012/0037352 | A1* | 2/2012 | Osaka | B60H 1/00021 165/202 |
| 2012/0174609 | A1* | 7/2012 | Matsuo | F24F 11/006 62/190 |
| 2012/0222438 | A1* | 9/2012 | Osaka | B60H 1/00271 62/126 |

(Continued)

FOREIGN PATENT DOCUMENTS

JP 08-258548 A 10/1996
JP 2003-205731 A 7/2003

(Continued)

*Primary Examiner* — Ljiljana Ciric
(74) *Attorney, Agent, or Firm* — Volpe and Koenig, P.C.

(57) ABSTRACT

A vehicular air-conditioning system includes: a vehicle interior air-conditioning apparatus which includes a device cooling circuit of a heat generating device mounted in a vehicle, and a refrigeration cycle circuit; and an intermediate heat exchanger for heat exchange between a device cooling medium of the device cooling circuit and an air-conditioning cooling medium of the refrigeration cycle circuit. A vehicle control apparatus is configured to determine a temperature of the cooling medium, and select a shorter control cycle timing of the vehicular air-conditioning system when the temperature of the cooling medium is greater than a predetermined temperature.

4 Claims, 18 Drawing Sheets

(56) References Cited

U.S. PATENT DOCUMENTS

| | | | | |
|---|---|---|---|---|
| 2013/0298583 A1* | 11/2013 | O'Donnell | H01M 6/5038 | 62/115 |
| 2013/0312442 A1* | 11/2013 | Suzuki | B60H 1/00921 | 62/160 |
| 2014/0110489 A1* | 4/2014 | Yasui | B60W 20/15 | 237/5 |
| 2014/0114532 A1* | 4/2014 | Choi | G08G 1/167 | 701/36 |
| 2014/0116076 A1* | 5/2014 | Kato | B60H 1/3205 | 62/186 |
| 2015/0033782 A1* | 2/2015 | Kondo | B60H 1/00921 | 62/244 |

FOREIGN PATENT DOCUMENTS

| | | |
|---|---|---|
| JP | 2005-186879 A | 7/2005 |
| JP | 2005-273998 A | 10/2005 |
| JP | 2006-321389 A | 11/2006 |
| JP | 2008-230594 A | 10/2008 |
| JP | 4285292 B2 | 4/2009 |

* cited by examiner

DEVICE COOLING OPERATION

COOLING OPERATION

COOLING AND DEVICE COOLING OPERATION

HEATING OPERATION

HEATING AND DEVICE COOLING OPERATION

DEHUMIDIFYING OPERATION

HEATING AND DEHUMIDIFYING OPERATION

HEATING OPERATION

DEFROSTING OPERATION

FIG. 14

| VEHICLE INTERIOR | MOTOR | INVERTER | BATTERY | GEARBOX |
|---|---|---|---|---|
| · HEATING, COOLING, AND DEHUMIDIFYING ARE PERFORMED.<br>· THERE IS CASE WHERE COOLING IS STOPPED OR WEAKENED TO COOL HEAT GENERATING ELEMENTS | · ONLY COOLING<br>· HIGH-TORQUE OUTPUT TIME IS EXTENDED BY COOLING<br>· TEMPERATURE OF DEVICE COOLING MEDIUM IS EQUAL TO OR LESS THAN 60°C | · ONLY COOLING<br>· HIGH-TORQUE OUTPUT TIME IS EXTENDED BY COOLING<br>· TEMPERATURE OF DEVICE COOLING MEDIUM IS EQUAL TO OR LESS THAN 60°C | · WARMING UP/ COOLING<br>· CHARGING AND DISCHARGING EFFICIENCY IS ENHANCED BY SETTING TEMPERATURE TO BE IN PREDETERMINED TEMPERATURE RANGE | · WARMING UP AT STARTING UP (ESPECIALLY IN WINTER SEASON)<br>· COOLING USING AIR-CONDITIONING SYSTEM IS NOT PERFORMED. EXHAUST HEAT IS USED.<br>· IN CASE WHERE TEMPERATURE OF LUBRICATING OIL IS LOW, AGITATION LOSS OF GEAR IS HIGH.<br>· IN CASE WHERE TEMPERATURE OF LUBRICATING OIL IS HIGH, OIL FILM CANNOT BE FORMED ON GEAR ENGAGEMENT SURFACE, AND FRICTIONAL LOSS IS HIGH. |

FIG. 16

| | | COMPONENT | | | | |
| --- | --- | --- | --- | --- | --- | --- |
| | | VEHICLE INTERIOR | MOTOR | INVERTER | BATTERY | GEARBOX |
| VEHICLE STATE | DURING CHARGING | × | × | × | → WARMING UP/COOLING BY SETTING TEMPERATURE TO BE IN PREDETERMINED TEMPERATURE RANGE | × |
| | BEFORE STARTING TRAVEL | → COOLING AND HEATING BY AC POWER SUPPLY | × | × | → WARMING UP/COOLING BY SETTING TEMPERATURE TO BE IN PREDETERMINED TEMPERATURE RANGE | → WARMING UP IN CASE OF LOW OIL TEMPERATURE |
| | BEFORE STARTING OFF | → | → | → | → WARMING UP/COOLING BY SETTING TEMPERATURE TO BE IN PREDETERMINED TEMPERATURE RANGE | → WARMING UP IN CASE OF LOW OIL TEMPERATURE |
| | ACCELERATION AND DECELERATION, BEFORE MOUNTAIN ROAD TRAVEL AND DURING TRAVEL | → or WEAKEN IN CASE OF COOLING STRENGTHEN IN CASE OF HEATING | ↓ | ↓ | → WARMING UP/COOLING BY SETTING TEMPERATURE TO BE IN PREDETERMINED TEMPERATURE RANGE | → EXHAUST HEAT RECOVERY |
| | DURING GENERAL ROAD TRAVEL | → | → | → | → | → |
| | BEFORE EXPRESSWAY TRAVEL AND DURING TRAVEL | → or WEAKEN IN CASE OF COOLING STRENGTHEN IN CASE OF HEATING | ↓ | ↓ | → WARMING UP/COOLING BY SETTING TEMPERATURE TO BE IN PREDETERMINED TEMPERATURE RANGE | → EXHAUST HEAT RECOVERY |
| | BEFORE TEMPORARY STOP (WAITING FOR TRAFFIC LIGHT, CONGESTION) | → | ↑ | ↑ | ↑↓ | → EXHAUST HEAT RECOVERY |
| | BEFORE STOP | × or WEAKEN | ↑ | ↑ | ↑↓ | × |
| | DURING STOP | × | × | × | × | × |

×: WITHOUT COOLING AND HEATING, AND COOLING/WARMING UP
↑: INCREASE SETTING TEMPERATURE
↓: DECREASE SETTING TEMPERATURE
→: NO CHANGE IN SETTING TEMPERATURE
↑↓: EXPAND SETTING TEMPERATURE RANGE

* CHANGED SETTING TEMPERATURE RETURNS TO ITS ORIGINAL LEVEL WHEN VEHICLE STATE IS CHANGED

VEHICULAR AIR-CONDITIONING SYSTEM INCLUDING A TEMPERATURE-DEPENDENT CONTROL CYCLE

TECHNICAL FIELD

The present invention relates to a vehicular air-conditioning system applied to an electric drive vehicle such as an electric vehicle, a hybrid vehicle, or an electric railway.

BACKGROUND ART

Regarding a vehicular air-conditioning system of a hybrid vehicle, for example, in PTL 1, a vehicular cooling system including: a cooling circuit which has a circulation pump that circulates a cooling medium and cools an in-vehicle heat generating element using the cooling medium circulated by the circulation pump; and a refrigeration cycle apparatus which has a compressor that compresses the cooling medium, a cooling medium cooler that cools the cooling medium from the compressor, a depressurizer that depressurizes the cooling medium from the cooling medium cooler, and evaporator that evaporates the cooling medium from the depressurizer by absorbing heat from the cooling medium in the cooling circuit, wherein the cooling circuit includes a vehicle interior air-conditioning heat exchanger for heat exchange between the cooling medium and air blown out to a vehicle interior, is described.

In addition, regarding a vehicular air-conditioning system in which a heat pump type cooling apparatus and a heating circulation apparatus are combined, for example, in PTL 2, in order to simplify the configuration of a heat pump type cooling apparatus in a system in which heating and cooling are performed using the heat pump type cooling apparatus, a vehicular air-conditioning system which includes: a heat pump type cooling apparatus A having a first circulation pathway; and a heating circulation apparatus B having a second circulation pathway, wherein a water-cooled condenser in the first circulation pathway is disposed in the second circulation pathway 8 and dissipates heat of a first cooling medium to a second cooling medium, a flow path switching valve that switches a flow path between a radiator side and a radiator bypass flow path is provided in the second circulation pathway 8, during a heating operation, the second cooling medium is caused to flow to the radiator bypass flow path by the flow path switching valve and air heated by a heater core is introduced to a vehicle interior as air-conditioned air, and during a cooling operation, the second cooling medium is caused to flow to the radiator by the flow path switching valve and air cooled by an evaporator is introduced to the vehicle interior as air-conditioned air, is described.

CITATION LIST

Patent Literature

PTL 1: Japanese Patent No. 4285292
PTL 2: JP-A-2008-230594

SUMMARY OF INVENTION

Technical Problem

In the vehicular air-conditioning system that is known according to the related art, there is a demand for a system which ensures an efficient operation of a device by causing the temperature of a cooling medium for cooling the heat generating element device related to vehicle travel to be a predetermined temperature or less and reliably cooling the device, and is further improved to prevent damage thereof and perform comfort air-conditioning of a vehicle interior.

Solution to Problem (1) According to a first aspect, a vehicular air-conditioning system includes: a vehicle interior air-conditioning apparatus which includes a device cooling circuit of a heat generating device mounted in a vehicle, and a refrigeration cycle circuit; and an intermediate heat exchanger for heat exchange between a device cooling medium of the device cooling circuit and an air-conditioning cooling medium of the refrigeration cycle circuit, wherein, when a temperature of the device cooling medium of the device cooling circuit becomes equal to or higher than a first predetermined temperature, a control cycle of the vehicular air-conditioning system is set to a short time, and the first predetermined temperature is less than an upper limit temperature of the device cooling medium and is determined from a heat capacity of the device cooling circuit and an amount of heat generated by the heat generating device.

(2) According to another aspect, a vehicular air-conditioning system includes: a vehicle interior air-conditioning apparatus which includes a device cooling circuit of a heat generating device mounted in a vehicle, and a refrigeration cycle circuit; and an intermediate heat exchanger for heat exchange between a device cooling medium of the device cooling circuit and an air-conditioning cooling medium of the refrigeration cycle circuit, wherein, in a case where a compressor of a refrigeration cycle is driven at minimum revolutions and in a case where an inside temperature reaches a target temperature, when a temperature of the device cooling medium becomes equal to or less than a second predetermined temperature, the compressor is stopped.

(3) According to another aspect, in the vehicular air-conditioning system, an amount of heat generated by the heat generating device is predicted on the basis of travel plan information such as road information or destination information, and the second predetermined temperature of the device cooling medium is changed on the basis of the predicted amount of heat generated.

(4) According to another aspect, in the vehicular air-conditioning system, the predetermined temperature of the device cooling medium is set to be equal to or greater than an outside air temperature.

(5) According to another aspect, in the vehicular air-conditioning system, in a case where the device cooling medium reaches an upper limit temperature or higher during a stop of the compressor, an output of the heat generating device is limited.

(6) According to another aspect, in the vehicular air-conditioning system, a time after a stop of the compressor is measured so that restarting is not performed until a predetermined time has passed.

(7) According to another aspect, a vehicular air-conditioning system includes: a vehicle interior air-conditioning apparatus which includes a device cooling circuit of a heat generating device mounted in a vehicle, and a refrigeration cycle circuit; and an intermediate heat exchanger for heat exchange between a device cooling medium of the device cooling circuit and an air-conditioning cooling medium of the refrigeration cycle circuit, wherein, in a case where there is a request of a motor that drives the vehicle for a high-torque operation and in a case where a temperature of the device cooling medium of the device cooling circuit is equal to or less than a third predetermined temperature, the motor is driven in the high-torque operation, and in a case where the temperature of the device cooling medium exceeds the predetermined temperature, the vehicular air-conditioning system is operated to reduce the temperature of the device cooling medium, and the high-torque operation is not performed.

Advantageous Effects of Invention

According to the present invention, it is possible to provide a vehicular air-conditioning system including a control apparatus capable of efficiently performing inside air-conditioning and device cooling.

BRIEF DESCRIPTION OF DRAWINGS

FIG. 14 illustrates objects of temperature control and the conditions thereof.

FIG. 16 illustrates vehicle states and changes in setting temperatures of heat generating elements 9 which are devices that need temperature control.

DESCRIPTION OF EMBODIMENTS

Hereinafter, an embodiment in which a vehicular air-conditioning system of the present invention is applied to an electric vehicle will be described, and the scope of the present invention is not limited thereto. In addition, the present invention is not limited to an electric vehicle, and may also be applied to electric drive vehicles such as a hybrid vehicle, an electric railway, a construction vehicle, or other special vehicles. In addition, in the embodiment, an AC motor driven by an inverter is exemplified and described. However, the present invention is not limited to the AC motor, and may also be applied to all kinds of rotating electric machines (motors and generators) such as a DC motor driven by a converter, for example, a thyristor Leonard device, or a pulse motor driven by a chopper power supply.

(1) Configuration of Vehicular Air-Conditioning System

Figure 1:
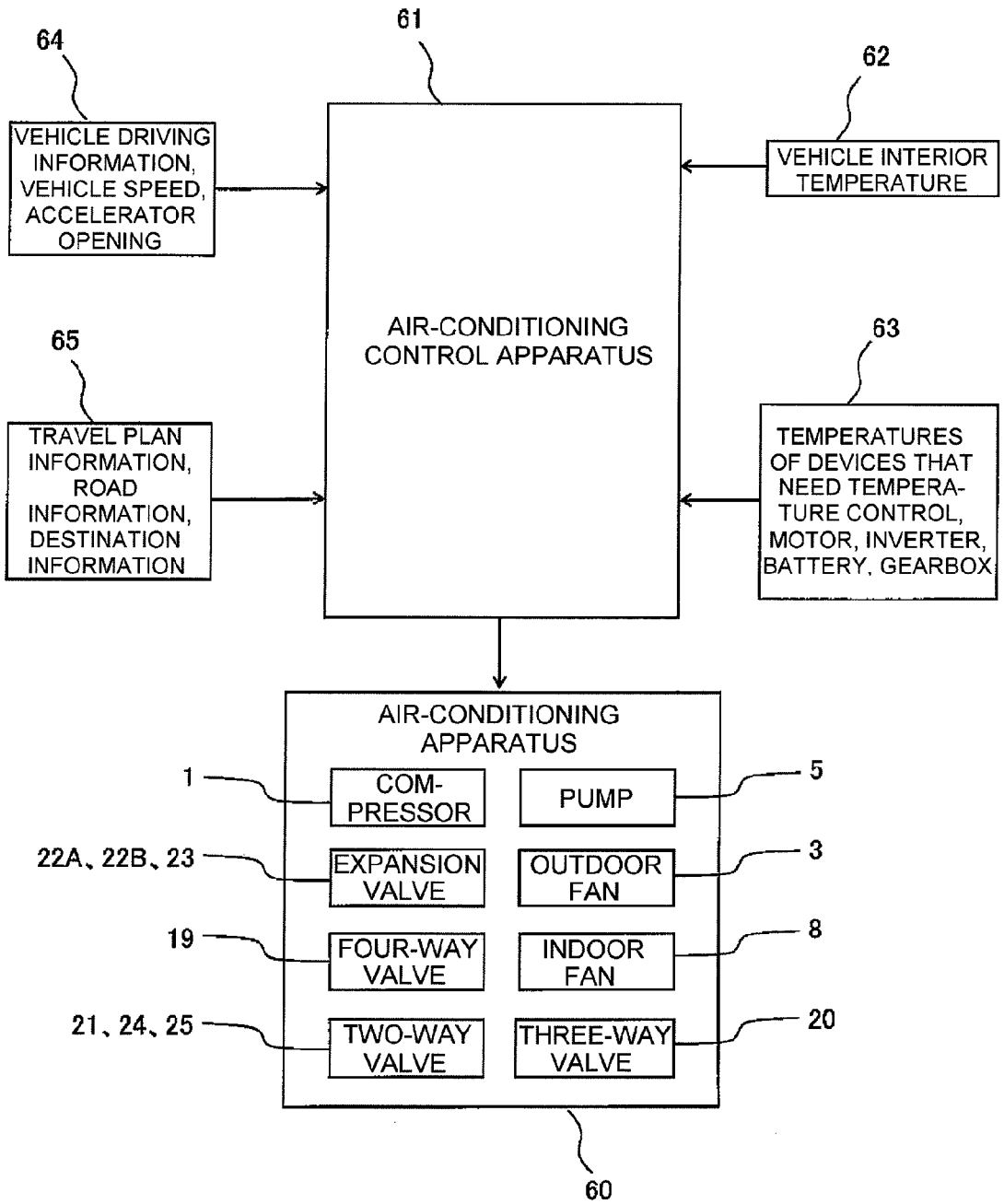
FIG. 1 illustrates the schematic configuration of a vehicular air-conditioning system of the present invention.

FIG. 1 is a diagram illustrating the schematic configuration of a vehicular air-conditioning system of the present invention. The vehicular air-conditioning system illustrated in FIG. 1 includes: an air-conditioning apparatus 60 for performing cooling and heating, cooling/heating of the vehicle interior or devices that need temperature control; and an air-conditioning control apparatus 61 which controls the air-conditioning apparatus 60. Various actuators provided in the air-conditioning apparatus 60 are controlled by control signals from the air-conditioning control apparatus 61. The actuators related to this embodiment include: a compressor 1; expansion valves 22A, 22B, and 23 as flow rate control means; a four-way valve 19 as first flow path switching means; a three-way valve 20 as second flow path switching means; two-way valves 21, 24, and 25; a pump 5; an outdoor fan 3; and an indoor fan 8.

A vehicle interior temperature 62 obtained by a temperature sensor and temperatures 63 of devices that need temperature control are input to the air-conditioning control apparatus 61. In this embodiment, as the devices that need temperature control, there are devices such as a motor, an inverter, a battery, and a gearbox, which are respectively provided with temperature sensors. In addition, to the air-conditioning control apparatus 61, vehicle speed and accelerator opening as vehicle driving information 64 are input from a vehicle speed sensor and an accelerator sensor, and road information, destination information, and the like as travel plan information 65 of a vehicle are input from a navigation device.

(2) Configuration of Air-Conditioning Apparatus

Figure 2:
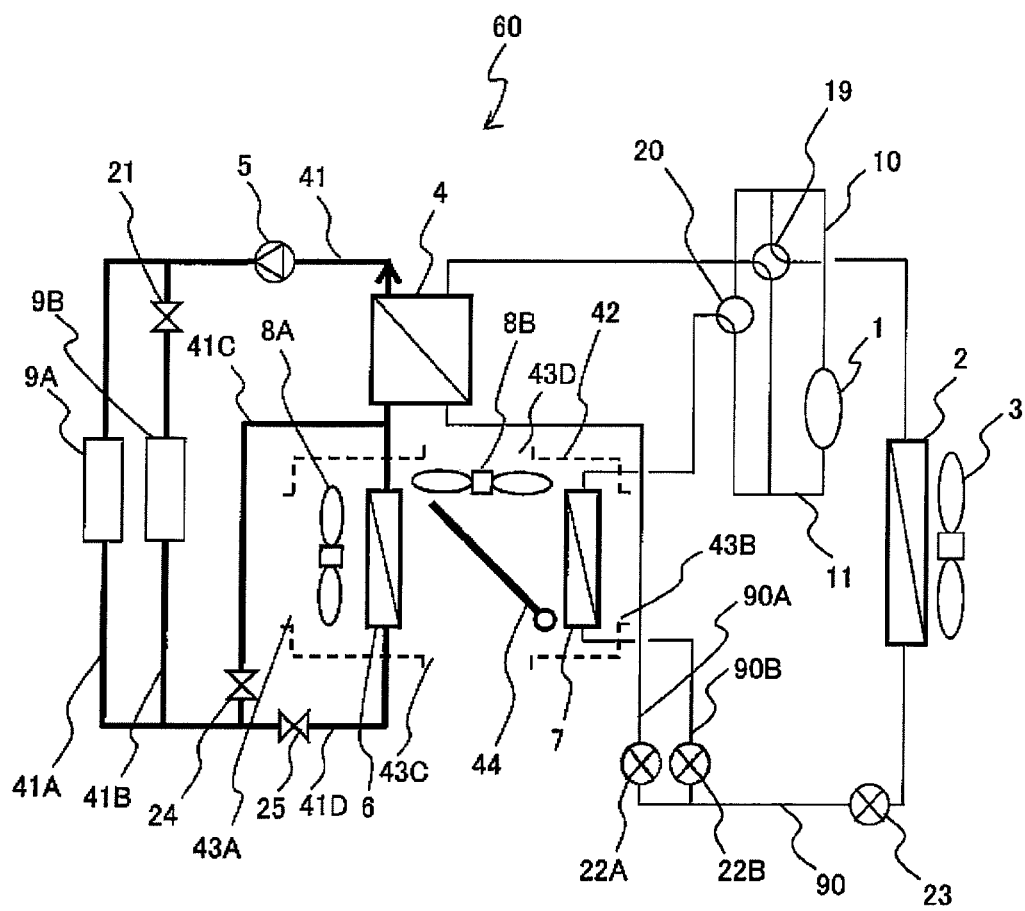
FIG. 2 illustrates the schematic configuration of Example 1 of an air-conditioning apparatus 60 according to the present invention.

FIG. 2 is a diagram illustrating the schematic configuration of the air-conditioning apparatus 60. The air-conditioning apparatus 60 includes: a refrigeration cycle circuit 90 through which an air-conditioning cooling medium (for example, a cooling medium) for performing interior air-conditioning and cooling of a heat generating element 9 is circulated; and a device cooling circuit 41 through which a device cooling medium that performs cooling of the heat generating element 9 (for example, a device cooling medium) is circulated.

In the refrigeration cycle circuit 90, the compressor 1 that compresses the cooling medium, an outdoor heat exchanger 2 for heat exchange between the air-conditioning cooling medium and outside air, an intermediate heat exchanger 4 for heat exchange between the air-conditioning cooling medium in a refrigeration cycle circuit 90A that branches off and the device cooling medium that flows through the device cooling circuit 41, and an indoor air-conditioning heat exchanger 7 for heat exchange between the air-conditioning cooling medium in a refrigeration cycle circuit 90B and vehicle interior air are connected by liquid pipes through which the air-conditioning cooling medium is circulated.

The four-way valve 19 is provided between an intake pipe 11 and a discharge pipe 10 of the compressor 1. By switching the four-way valve 19, any one of the intake pipe 11 and the discharge pipe 10 may be connected to the outdoor heat exchanger 2 and the other thereof may be connected to the intermediate heat exchanger and the indoor air-conditioning heat exchanger 7. The four-way valve 19 illustrated in FIG. 2 connects the discharge pipe 10 to the outdoor heat exchanger 2 and connects the intake pipe 11 to the intermediate heat exchanger 4.

One end of the indoor air-conditioning heat exchanger 7 is connected to the outdoor heat exchanger 2, and the other end thereof is connected to be switched to any one of the discharge pipe 10 and the intake pipe 11 via the three-way valve 20. The expansion valves 23, 22A, and 22B that act as the flow rate control means of the air-conditioning cooling medium are respectively provided on the side of the outdoor heat exchanger 2 that is not connected to the compressor 1, between the intermediate heat exchanger 4 and the outdoor heat exchanger 2, and between the indoor air-conditioning heat exchanger 7 and the outdoor heat exchanger 2. In addition, the outdoor heat exchanger 2 is provided with the outdoor fan 3 for blowing the outside air.

In the device cooling circuit 41, the indoor cooling heat exchanger 6 for heat exchange between the device cooling medium and vehicle interior air, the intermediate heat exchanger 4, the pump 5 for circulating the device cooling medium in the device cooling circuit 41, and the heat generating element 9 on which temperature control is needed are sequentially connected in an annular shape.

The device cooling circuit 41 is provided with a bypass circuit 41C that bypasses both ends of the indoor cooling heat exchanger 6. The bypass circuit 41C is provided with the two-way valve 24, and a main circuit 41D that passes the indoor cooling heat exchanger 6 is provided with the two-way valve 25. It is possible to switch the flow paths of the device cooling medium by opening and closing operations of the two-way valves 24 and 25. In addition, in the device cooling circuit 41, a plurality of heat generating elements 9A and 9B are connected in parallel as illustrated in FIG. 2 for temperature control.

The two-way valve 21 is installed in a device cooling circuit 41B including the heat generating element 9B, and no two-way valve is installed in a device cooling circuit 41A including the heat generating element 9A. Accordingly, both the heat generating elements 9A and 9B may be subjected to temperature control when the two-way valve 21 is opened, while only the heat generating element 9A may be subjected to temperature control when the two-way valve 21 is closed. In addition, a two-way valve may also be provided in the device cooling circuit 41A including the heat generating element 9A, and a plurality of the heat generating elements 9 may be connected in series. A method of connecting heat generating elements 9 and a method of installing two-way values may be changed depending on the temperature conditions of the heat generating elements.

An indoor unit 42 that blows temperature-controlled air for indoor air-conditioning includes: indoor fans 8A and 8B that take in air from the inside (vehicle interior) or the outside (vehicle exterior) and blow to the inside or the outside; the indoor cooling heat exchanger 6; the indoor air-conditioning heat exchanger 7; a switching damper 44 that switches air subjected to heat exchange in the indoor cooling heat exchanger 6 to be blown to the inside or the outside; and air inlet and outlet ports 43A, 43B, 43C, and 43D which are ports through which air from the inside or the outside are taken in or air is blown to the inside or the outside.

Next, operations of the air-conditioning apparatus 60 illustrated in FIG. 2 will be described. In this embodiment, temperature control of the heat generating element 9 is performed by circulating the device cooling medium using the pump 5. Operations of other devices are changed depending on air-conditioning load or the amount of heat generated by the heat generating element 9. Hereinafter, operations of device cooling, cooling, cooling+device cooling, heating, heating+device cooling, dehumidifying, heating and dehumidifying, device heating, and defrosting will be described.

(3) Device Cooling Operation

Figure 3:
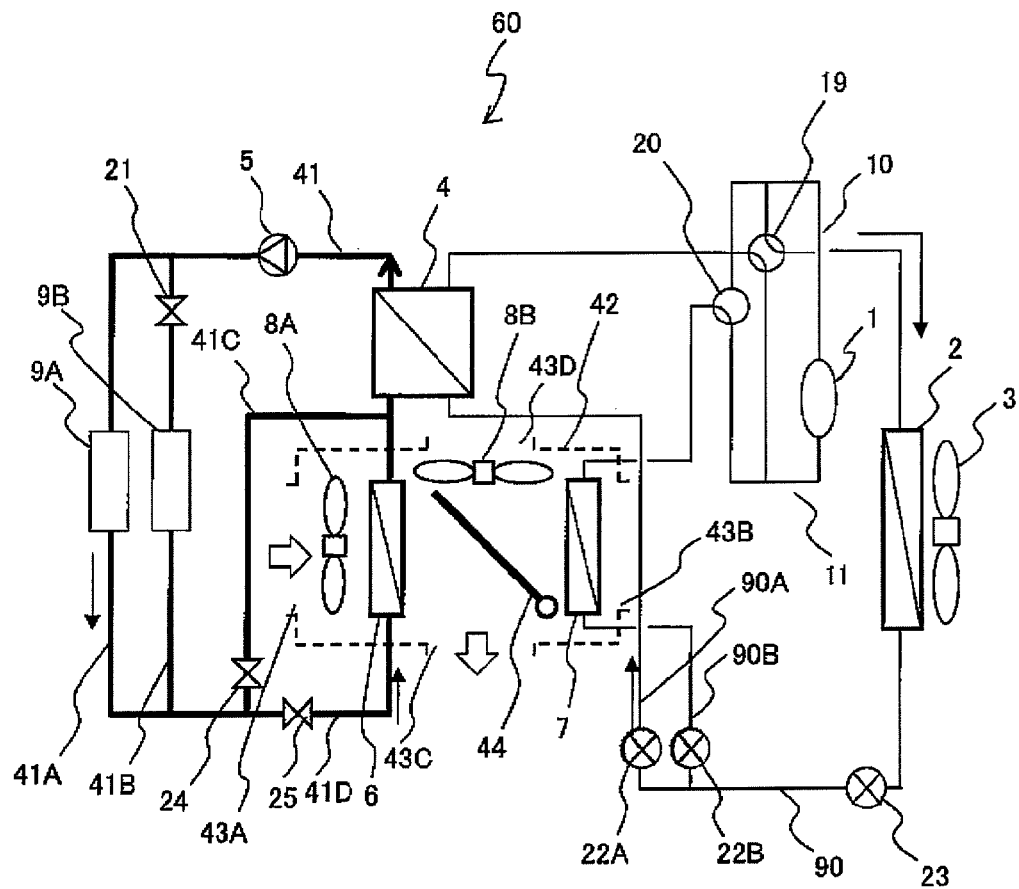
FIG. 3 illustrates the schematic configuration of the air-conditioning apparatus 60 of Example 1 in a device cooling operation mode.

A device cooling operation is an operation of cooling the heat generating element 9 in a state of indoor air-conditioning is not performed and is described using FIG. 3. Regarding this operation, there are a case where the device cooling medium circulated through the device cooling circuit 41 is cooled only by the indoor cooling heat exchanger 6, and a case where the device cooling medium is cooled by the indoor cooling heat exchanger 6 and the intermediate heat exchanger 4.

By closing the two-way valve 24 of the device cooling circuit 41 and opening the two-way valve 25, the device cooling medium is circulated through the indoor cooling heat exchanger 6 and the intermediate heat exchanger 4 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B. In a case of cooling both the heat generating elements 9A and 9B, the two-way valve 21 is opened.

The switching damper 44 in the indoor unit 42 is set so that air taken into the air inlet and outlet port 43A is blown out from the air inlet and outlet port 43C through the indoor cooling heat exchanger 6 as illustrated in FIG. 3. The device cooling medium may be cooled by the air passing through the indoor cooling heat exchanger 6. In addition, a cooling ability may be adjusted by the volume of air taken into the indoor fan 8A. In addition, the air inlet and outlet port 43C communicates with the outside (vehicle exterior) through a duct (not shown) such that warm air is not blown to the inside.

In a case where the device cooling medium is cooled by the intermediate heat exchanger 4, as illustrated in FIG. 3, the four-way valve 19 and the three-way valve 20 are connected to each other so that the discharge pipe 10 of the compressor 1 is connected to the outdoor heat exchanger 2 and the intake pipe 11 of the compressor 1 is connected to the intermediate heat exchanger 4 and the indoor air-conditioning heat exchanger 7. In addition, the expansion valve 22B is totally closed so as not to cause the air-conditioning cooling medium to flow to the indoor air-conditioning heat exchanger 7. That is, the outdoor heat exchanger 2 functions as a condenser and the intermediate heat exchanger 4 functions as an evaporator.

The air-conditioning cooling medium compressed by the compressor 1 is liquefied by dissipating heat at the outdoor heat exchanger 2, and thereafter flows to the intermediate heat exchanger 4 through the totally-opened expansion valve 23. The air-conditioning cooling medium that flows through the intermediate heat exchanger 4 is depressurized by the expansion valve 22A to have a low temperature and a low pressure, evaporates by absorbing heat from the device cooling medium of the device cooling circuit 41 at the intermediate heat exchanger 4, and returns to the compressor 1 through the four-way valve 19. By using the refrigeration cycle circuit 90 as above, the device cooling medium is cooled through heat exchange between the device cooling medium, and the air-conditioning cooling medium at the intermediate heat exchanger 4.

As described above, the device cooling medium may be cooled by the indoor cooling heat exchanger 6 and the intermediate heat exchanger 4. In a case where the device cooling medium has a temperature lower than a predetermined temperature, the refrigeration cycle circuit 90 is not used, and the device cooling medium is cooled only by the indoor cooling heat exchanger 6. In a case where the device cooling medium has a temperature higher than the predetermined temperature, the device cooling medium is cooled by the indoor cooling heat exchanger 6 and the intermediate heat exchanger 4 using the refrigeration cycle circuit 90.

In addition, in order to control the temperature of the device cooling medium, the air volume of the indoor fan 8A, the flow rate of the pump 5, the revolutions of the compressor 1, the opening of the expansion valve 22A, and the air volume of the outdoor fan 3 may be controlled. In a case where the device cooling medium has a temperature higher than a target temperature, the air volume of the indoor fan 8A may be increased, the flow rate of the pump 5 may be increased, the revolutions of the compressor 1 may be increased, the opening of the expansion valve 22A may be increased, and the air volume of the outdoor fan 3 may be increased. On the other hand, in a case where the device cooling medium has a temperature lower than a target temperature, the air volume of the indoor fan 8A may be reduced, the flow rate of the pump 5 may be reduced, the revolutions of the compressor 1 may be reduced, the opening of the expansion valve 22A may be reduced, and the air volume of the outdoor fan 3 may be reduced. In addition, not all the actuators need to be controlled, and at least one actuator may be controlled.

(4) Cooling Operation

Figure 4:
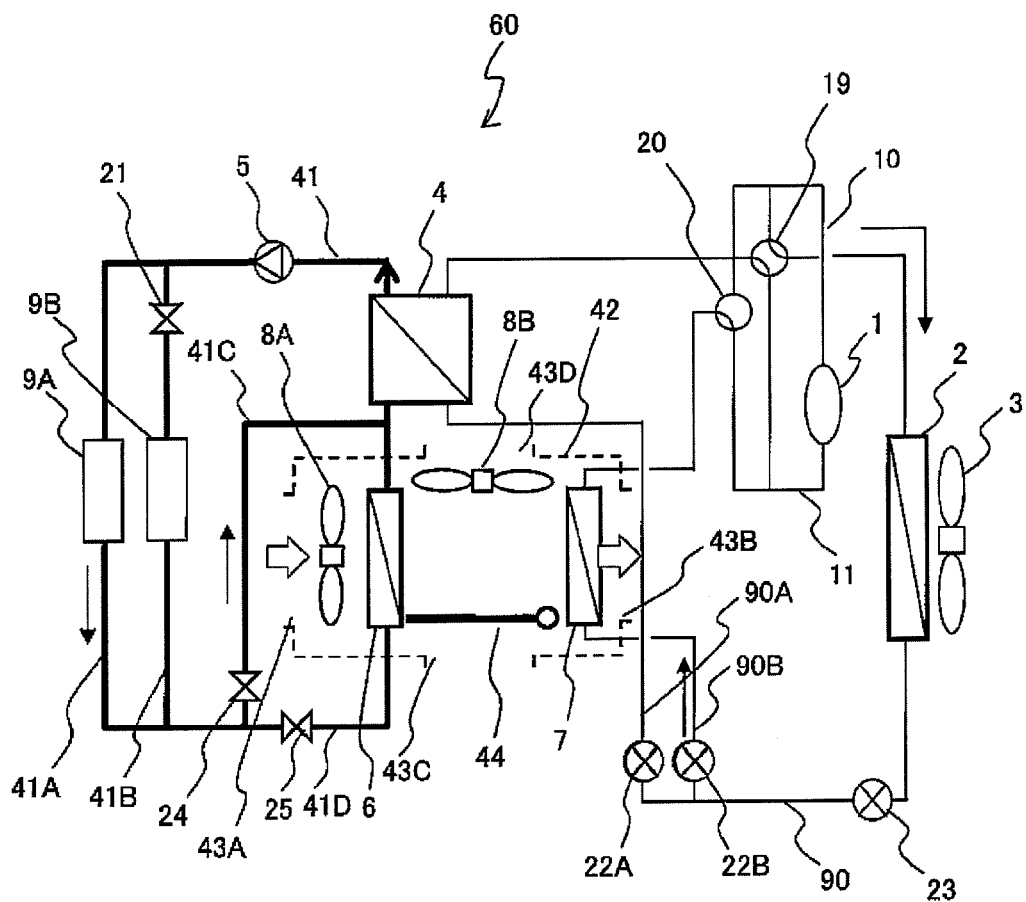
FIG. 4 illustrates the schematic configuration of the air-conditioning apparatus 60 of Example 1 in a cooling operation mode.

A cooling operation is an operation of cooling the inside without cooling the heat generating element 9, and is described using FIG. 4.

In the device cooling circuit 41, by closing the two-way valve 25 and opening the two-way valve 24, the device cooling medium does not flow to the indoor cooling heat exchanger 6 and flows to the device cooling circuit 41C by driving of the pump 5. Even in the case of not cooling the heat generating element 9 as such, the device cooling medium of the device cooling circuit 41 is circulated because a biased temperature increase in the device cooling medium that is present in apart of the heat generating element 9 is suppressed. In a case of closing the two-way valve 21, the device cooling medium flows only to the device cooling circuit 41A, and in a case of opening the two-way valve 21, the device cooling medium flows to the device cooling circuits 41A and 41B.

The switching damper 44 in the indoor unit 42 is set so that air taken into the air inlet and outlet port 43A is blown out from the air inlet and outlet port 43B through the indoor cooling heat exchanger 6 and the indoor air-conditioning heat exchanger 7 as illustrated in FIG. 4. Since the device cooling medium is not circulated through the indoor cooling heat exchanger 6, the temperature of air passing through the indoor cooling heat exchanger 6 does not change. In addition, the air inlet and outlet port 43B communicates with the inside (vehicle interior) through a duct (not shown) for temperature control of the inside.

In addition, in the cooling operation, as illustrated in FIG. 4, the four-way valve 19 and the three-way valve 20 are connected to each other so that the discharge pipe 10 of the compressor 1 is connected to the outdoor heat exchanger 2 and the intake pipe 11 of the compressor 1 is connected to the intermediate heat exchanger 4 and the indoor air-conditioning heat exchanger 7. In addition, the expansion valve 22A is totally closed so as not to cause the air-conditioning cooling medium to flow to the intermediate heat exchanger 4. That is, the outdoor heat exchanger 2 functions as a condenser and the indoor air-conditioning heat exchanger 7 functions as an evaporator.

The air-conditioning cooling medium compressed by the compressor 1 is liquefied by dissipating heat at the outdoor heat exchanger 2, and thereafter flows to the indoor air-conditioning heat exchanger 7 through the totally-opened expansion valve 23. The air-conditioning cooling medium that flows through the indoor air-conditioning heat exchanger 7 is depressurized by the expansion valve 22B to have a low temperature and a low pressure, evaporates by absorbing heat from the air taken into the air inlet and outlet port 43A at the indoor air-conditioning heat exchanger 7, and returns to the compressor 1 through the three-way valve 20. The air cooled through heat exchange at the indoor air-conditioning heat exchanger 7 as such is blown to the vehicle interior from the air inlet and outlet port 43B.

In addition, in order to adjust the temperature of the air blown out from the air inlet and outlet port 43B, the air volume of the indoor fan 8A, the revolutions of the compressor 1, the opening of the expansion valve 22B, and the air volume of the outdoor fan 3 may be controlled. In a case where the blown air has a temperature higher than a target temperature, the air volume of the indoor fan 8A may be increased, the revolutions of the compressor 1 may be increased, the opening of the expansion valve 22B may be increased, and the air volume of the outdoor fan 3 may be increased. On the other hand, in a case where the blown air has a temperature lower than a target temperature, the air volume of the indoor fan 8A may be reduced, the revolutions of the compressor 1 may be reduced, the opening of the expansion valve 22B may be reduced, and the air volume of the outdoor fan 3 may be reduced. In addition, not all the actuators need to be controlled, and at least one actuator may be controlled.

(5) Cooling and Device Cooling Operation

Figure 5:
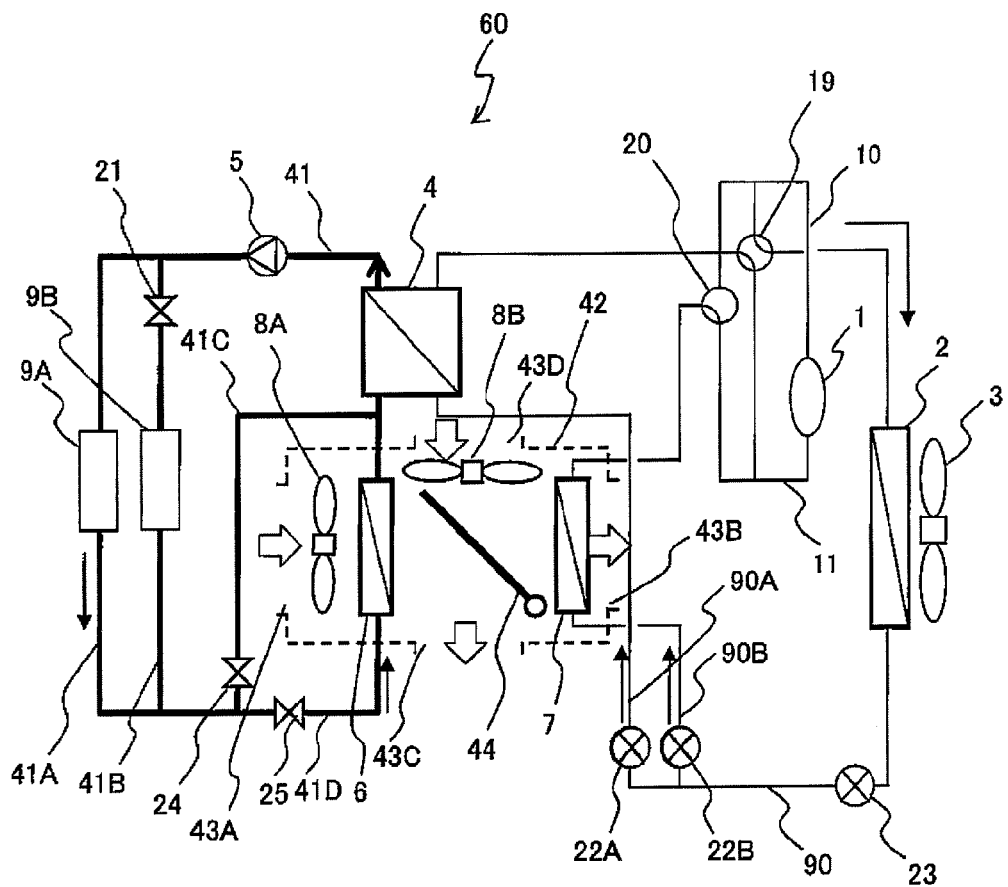
FIG. 5 illustrates the schematic configuration of the air-conditioning apparatus 60 of Example 1 in a cooling and device cooling operation mode.

A cooling and device cooling operation is an operation of cooling the heat generating element 9 and cooling the inside, and is described using FIG. 5. Regarding this operation, there are a case where the device cooling medium circulated through the device cooling circuit 41 is cooled only by the indoor cooling heat exchanger 6, and a case where the device cooling medium is cooled by the indoor cooling heat exchanger 6 and the intermediate heat exchanger 4.

In the device cooling circuit 41, by closing the two-way valve 24 and opening the two-way valve 25, the device cooling medium is circulated through the indoor cooling heat exchanger 6 and the intermediate heat exchanger 4 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B. In a case of cooling both the heat generating elements 9A and 9B, the two-way valve 21 is opened.

The switching damper 44 in the indoor unit 42 is set so that air taken into the air inlet and outlet port 43A is blown out from the air inlet and outlet port 43C through the indoor cooling heat exchanger 6 as illustrated in FIG. 5. The air inlet and outlet port 43C communicates with the outside (vehicle exterior) through the duct (not shown) such that the air is not blown to the inside. In addition, air taken into the air inlet and outlet port 43D is blown out from the air inlet and outlet port 43B through the indoor air-conditioning heat exchanger 7 by the indoor fan 8B. The device cooling medium may be cooled by the air passing through the indoor cooling heat exchanger 6. The air passing through the indoor air-conditioning heat exchanger 7 is cooled by the indoor air-conditioning heat exchanger 7 such that the cooled air is blown out to the inside (vehicle interior).

In addition, in the cooling and device cooling operation, as illustrated in FIG. 5, the four-way valve 19 and the three-way valve 20 are connected to each other so that the discharge pipe 10 of the compressor 1 is connected to the outdoor heat exchanger 2 and the intake pipe 11 of the compressor 1 is connected to the intermediate heat exchanger 4 and the indoor air-conditioning heat exchanger 7. That is, the outdoor heat exchanger 2 functions as a condenser and the intermediate heat exchanger 4 and the indoor air-conditioning heat exchanger 7 function as evaporators.

The air-conditioning cooling medium compressed by the compressor 1 is liquefied by dissipating heat at the outdoor heat exchanger 2, and thereafter flows to the intermediate heat exchanger 4 and the indoor air-conditioning heat exchanger 7 through the totally-opened expansion valve 23. The air-conditioning cooling medium that flows through the intermediate heat exchanger 4 is depressurized by the expansion valve 22A to have a low temperature and a low pressure, evaporates by absorbing heat from the device cooling medium of the device cooling circuit 41 at the intermediate heat exchanger 4, and returns to the compressor 1 through the four-way valve 19.

In this manner, the device cooling medium is cooled through heat exchange between the device cooling medium, and the air-conditioning cooling medium at the intermediate heat exchanger 4. The air-conditioning cooling medium that flows through the indoor air-conditioning heat exchanger 7 is depressurized by the expansion valve 22B to have a low temperature and a low pressure, evaporates by absorbing heat from the air taken into the air inlet and outlet port 43D at the indoor air-conditioning heat exchanger 7, and returns to the compressor 1 through the three-way valve 20. The air cooled through heat exchange at the indoor air-conditioning heat exchanger 7 as such is blown out to the inside from the air inlet and outlet port 43B.

As described above, since both the intermediate heat exchanger 4 and the indoor air-conditioning heat exchanger 7 are able to be used as evaporators, cooling of the vehicle interior and cooling of the heat generating element 9 may be simultaneously realized. Furthermore, the intermediate heat exchanger 4 and the indoor air-conditioning heat exchanger 7 are connected to the intake pipe 11 of the compressor 1 in parallel and the refrigeration cycle circuits 90A and 90B are respectively provided with the expansion valves 22A and 22B, and thus the flow rates of the air-conditioning cooling medium flowing through the intermediate heat exchanger 4 and the indoor air-conditioning heat exchanger 7 may be respectively and arbitrarily changed.

As a result, the temperature of the device cooling medium and the temperature of the air-conditioning cooling medium may be respectively controlled to arbitrarily desired temperatures. Therefore, even in a case where the temperature of the air-conditioning cooling medium is sufficiently reduced to perform cooling, the temperature of the device cooling medium flowing through the inside of the heat generating element 9 may be maintained at a high level by suppressing the flow rate of the cooling medium flowing through the intermediate heat exchanger 4.

In addition, the device cooling medium may be cooled by the indoor cooling heat exchanger 6 and the intermediate heat exchanger 4 as above. In a case where the device cooling medium has a temperature lower than a predetermined temperature, the refrigeration cycle circuit 90 is not used, and the device cooling medium is cooled only by the indoor cooling heat exchanger 6. In a case where the device cooling medium has a temperature higher than the predetermined temperature, the device cooling medium is cooled by the indoor cooling heat exchanger 6 and the intermediate heat exchanger 4 using the refrigeration cycle circuit 90. This is controlled by adjusting the opening of the expansion valve 22A. In a case of totally closing the expansion valve 22A, the air-conditioning cooling medium does not flow to the intermediate heat exchanger 4, and thus the device cooling medium is cooled only by the indoor cooling heat exchanger 6.

In addition, in order to control the temperature of the device cooling medium and the temperature of the air blown out from the air inlet and outlet port 43B, the air volumes of the indoor fans 8A and 8B, the flow rate of the pump 5, the revolutions of the compressor 1, the openings of the expansion valves 22A and 22B, and the air volume of the outdoor fan 3 may be controlled. In a case where the device cooling medium has a temperature higher than a target temperature or in a case where the blown air has a temperature higher than a target temperature, the air volumes of the indoor fans 8A and 8B may be increased, the flow rate of the pump 5 may be increased, the revolutions of the compressor 1 may be increased, the openings of the expansion valves 22A and 22B may be increased, and the air volume of the outdoor fan 3 may be increased.

On the other hand, in a case where the device cooling medium has a temperature lower than a target temperature or in a case where the blown air has a temperature lower than a target temperature, the air volumes of the indoor fans 8A and 8B may be reduced, the flow rate of the pump 5 may be reduced, the revolutions of the compressor 1 may be reduced, the openings of the expansion valves 22A and 22B may be reduced, and the air volume of the outdoor fan 3 may be reduced. In addition, not all the actuators need to be controlled, and at least one actuator may be controlled.

(6) Heating Operation

Figure 6:
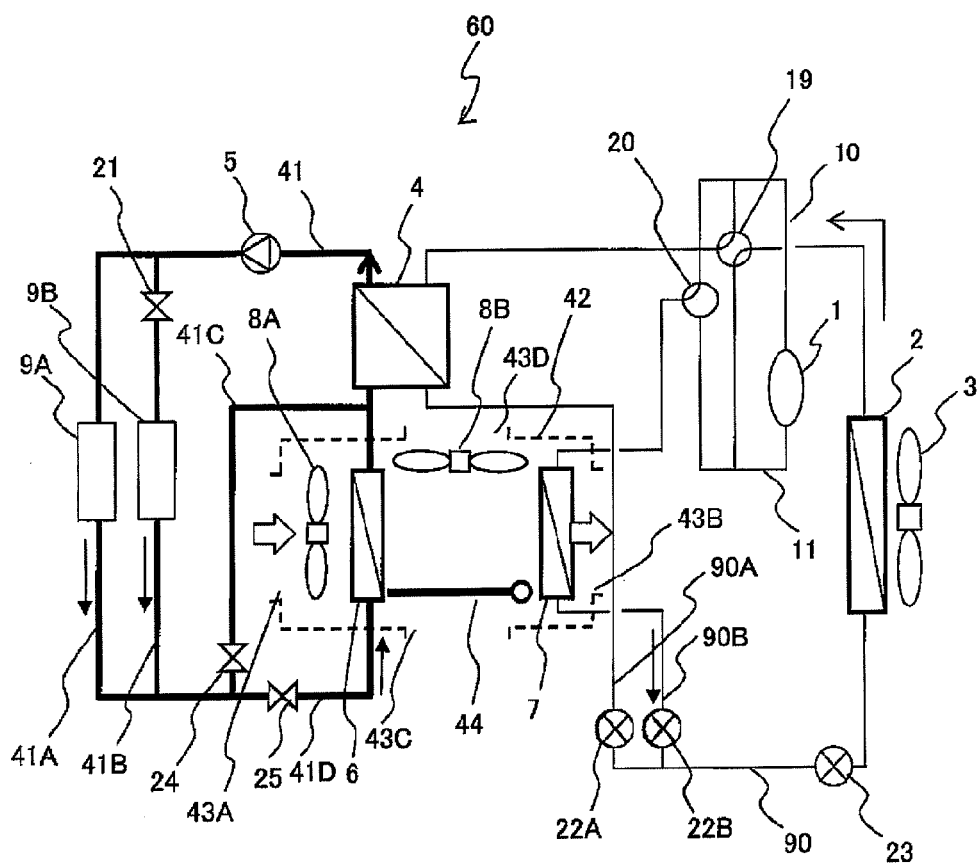
FIG. 6 illustrates the schematic configuration of the air-conditioning apparatus 60 of Example 1 in a heating operation mode.

A heating operation is an operation of heating the inside without cooling the heat generating element 9, and is described using FIG. 6.

In the device cooling circuit 41, by opening the two-way valve 25 and closing the two-way valve 24, the device cooling medium flows to the indoor cooling heat exchanger 6 and the intermediate heat exchanger 4 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B.

The switching damper 44 in the indoor unit 42 is set so that air taken into the air inlet and outlet port 43A is blown out from the air inlet and outlet port 43B through the indoor cooling heat exchanger 6 and the indoor air-conditioning heat exchanger 7 as illustrated in FIG. 6. Since the device cooling medium warmed by the heat generating element 9 is circulated through the indoor cooling heat exchanger 6, the temperature of the air passing through the indoor cooling heat exchanger 6 is increased. In addition, the air inlet and outlet port 43B communicates with the inside (vehicle interior) for temperature control of the inside.

In a case where a heating load is low, exhaust heat from the heat generating element 9 as described above is used for heating, and the refrigeration cycle circuit 90 is not used for heating. In this manner, air-conditioning with suppressed energy consumption may be realized. In a case of opening the two-way valve 21, exhaust heat of the heat generating element 9B through which the device cooling medium flows even in the device cooling circuit 41B is able to be used for heating, thereby further suppressing energy consumption.

In a case where the heating load is not satisfied by exhaust heat of the heat generating elements 9A and 9B, in addition to the exhaust heat of the heat generating elements 9A and 9B, the refrigeration cycle circuit 90 is used together. In this case, as illustrated in FIG. 6, the four-way valve 19 and the three-way valve 20 are connected to each other so that the discharge pipe 10 of the compressor 1 is connected to the intermediate heat exchanger 4 and the indoor air-conditioning heat exchanger 7 and the intake pipe 11 is connected to the outdoor heat exchanger 2. In addition, the expansion valve 22A is totally closed and the expansion valve 22B is totally opened so that the air-conditioning cooling medium does not flow to the intermediate heat exchanger 4 and flows only to the indoor air-conditioning heat exchanger 7. That is, the indoor air-conditioning heat exchanger 7 functions as a condenser and the outdoor heat exchanger 2 functions as an evaporator.

The air-conditioning cooling medium compressed by the compressor 1 condenses and is liquefied by dissipating heat at the indoor air-conditioning heat exchanger 7. Thereafter, the liquefied air-conditioning cooling medium is depressurized by the expansion valve 23, is then evaporated and gasified through heat exchange with outside air at the outdoor heat exchanger 2, and returns to the compressor 1.

As described above, the air taken into the air inlet and outlet port 43A is heated at the indoor cooling heat exchanger 6 by the device cooling medium flowing through the device cooling circuit 41. In addition, the air that is further warmed through heat exchange at the indoor air-conditioning heat exchanger 7 disposed on the downstream side is blown out to the inside from the air inlet and outlet port 43B. As such, a configuration in which the air blown out to the inside is warmed by exhaust heat of the heat generating element 9 and is thereafter further warmed by the refrigeration cycle circuit 90 is achieved. Heating of the air using refrigeration cycle circuit 90 compensates for a shortage of the temperature of the air warmed by exhaust heat of the heat generating element 9 such that an air-conditioning apparatus with low energy consumption may be configured.

In addition, in order to control the temperature of the air blown out from the air inlet and outlet port 43B, the air volume of the indoor fan 8A, the flow rate of the pump 5, the revolutions of the compressor 1, the opening of the expansion valve 22B, and the air volume of the outdoor fan 3 may be controlled. In a case where the blown air has a temperature lower than a target temperature, the air volume of the indoor fan 8A may be increased, the flow rate of the pump 5 may be increased, the revolutions of the compressor 1 may be increased, the opening of the expansion valve 22B may be increased, and the air volume of the outdoor fan 3 may be increased. On the other hand, in a case where the blown air has a temperature higher than a target temperature, the air volume of the indoor fan 8A may be reduced, the flow rate of the pump 5 may be reduced, the revolutions of the compressor 1 may be reduced, the opening of the expansion valve 22B may be reduced, and the air volume of the outdoor fan 3 may be reduced. In addition, not all the actuators need to be controlled, and at least one actuator may be controlled.

(7) Heating and Device Cooling Operation

Figure 7:
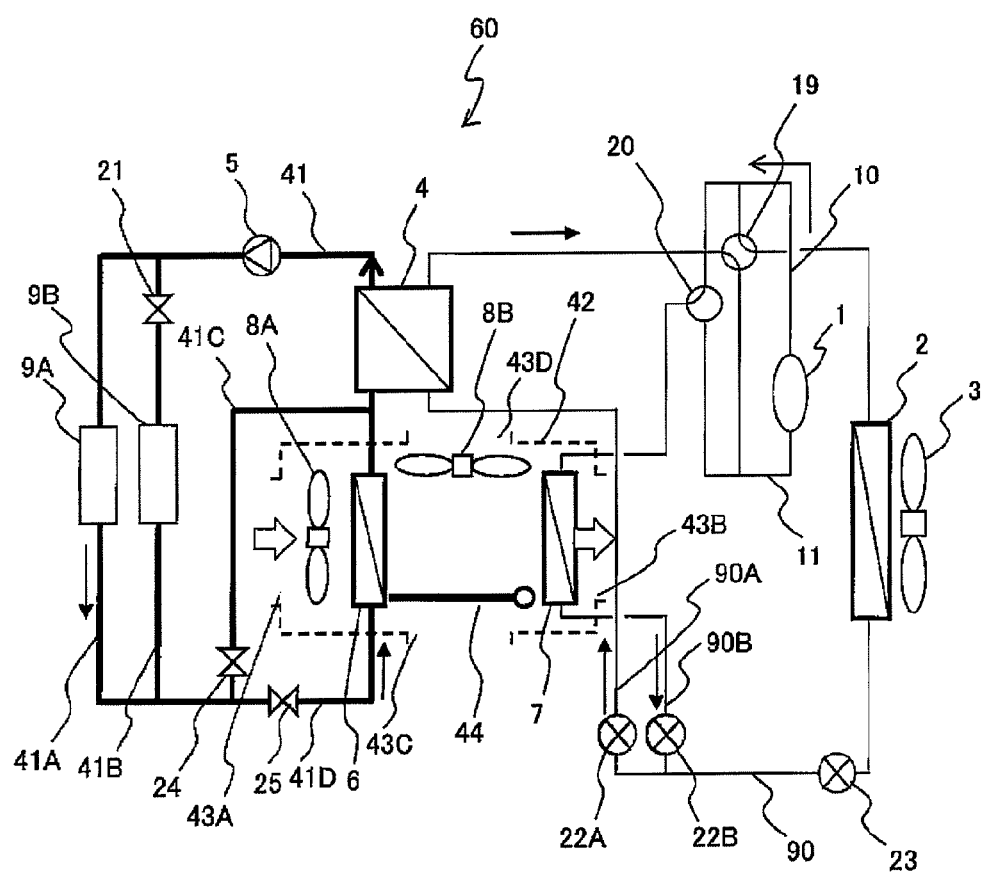
FIG. 7 illustrates the schematic configuration of the air-conditioning apparatus 60 of Example 1 in a heating and device cooling operation mode.

A heating and device cooling operation is an operation of cooling the heat generating element 9 and heating the inside, and is described using FIG. 7. As described in the above heating operation, an increase in the temperature of the heat generating element 9 may be suppressed as long as the device cooling medium is maintained at a target temperature or less by heat dissipation at the indoor cooling heat exchanger 6. However, in a case where heat dissipation at the indoor cooling heat exchanger 6 is insufficient or in a case where the temperature of the device cooling medium is temporarily reduced as described later, device cooling using the refrigeration cycle circuit 90 is needed.

In the heating and device cooling operation, as illustrated in FIG. 7, the four-way valve 19 and the three-way valve 20 are connected to each other so that the discharge pipe 10 of the compressor 1 is connected to the outdoor heat exchanger 2 and the indoor air-conditioning heat exchanger 7 and the intake pipe 11 is connected to the intermediate heat exchanger 4. In addition, the expansion valve 23 is totally closed and the expansion valve 22B is totally opened so as not to cause the air-conditioning cooling medium to flow to the outdoor heat exchanger 2. That is, the indoor air-conditioning heat exchanger 7 functions as a condenser and the intermediate heat exchanger 4 functions as an evaporator.

The air-conditioning cooling medium compressed by the compressor 1 condenses and is liquefied by dissipating heat at the indoor air-conditioning heat exchanger 7. Thereafter, the liquefied air-conditioning cooling medium is depressurized by the expansion valve 22A, is then evaporated and gasified through heat exchange with the device cooling medium flowing through the device cooling circuit 41 at the intermediate heat exchanger 4, and returns to the compressor 1. At the intermediate heat exchanger 4, the device cooling medium is cooled through heat exchange between the device cooling medium and the air-conditioning cooling medium.

In the device cooling circuit 41, by opening the two-way valve 25 and closing the two-way valve 24, the device cooling medium flows to the indoor cooling heat exchanger 6 and the intermediate heat exchanger 4 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B.

The switching damper 44 in the indoor unit 42 is set so that air taken into the air inlet and outlet port 43A is blown out from the air inlet and outlet port 43B through the indoor cooling heat exchanger 6 and the indoor air-conditioning heat exchanger 7 as illustrated in FIG. 7. Since the device cooling medium warmed by the heat generating element 9 is circulated through the indoor cooling heat exchanger 6, the temperature of the air passing through the indoor cooling heat exchanger 6 is increased.

In addition, the air that is further warmed through heat exchange at the indoor air-conditioning heat exchanger 7 disposed on the downstream side is blown out to the inside from the air inlet and outlet port 43B. As such, a configuration in which the air blown out to the inside is warmed by exhaust heat of the heat generating element 9 and is thereafter further warmed by the refrigeration cycle circuit 90 is achieved. In addition, the air inlet and outlet port 43B communicates with the inside (vehicle interior) through a duct (not shown) for temperature control of the inside.

In addition, it is possible to cool the device cooling medium through heat dissipation at the indoor cooling heat exchanger 6 and heat exchange at the intermediate heat exchanger 4. In addition, in order to control the temperature of the device cooling medium and the temperature of the air blown out from the air inlet and outlet port 43B, the air volume of the indoor fan 8A, the flow rate of the pump 5, the revolutions of the compressor 1, and the opening of the expansion valve 22A may be controlled. In a case where the device cooling medium has a temperature higher than a target temperature or in a case where the blown air has a temperature lower than a target temperature, the air volume of the indoor fan 8A may be increased, the flow rate of the pump 5 may be increased, the revolutions of the compressor 1 may be increased, and the opening of the expansion valve 22A may be increased.

On the other hand, in a case where the device cooling medium has a temperature lower than a target temperature or in a case where the blown air has a temperature higher than a target temperature, the air volume of the indoor fan 8A may be reduced, the flow rate of the pump 5 may be reduced, the revolutions of the compressor 1 may be reduced, and the opening of the expansion valve 22A may be reduced. In addition, not all the actuators need to be controlled, and at least one actuator may be controlled.

(8) Dehumidifying Operation

Figure 8:
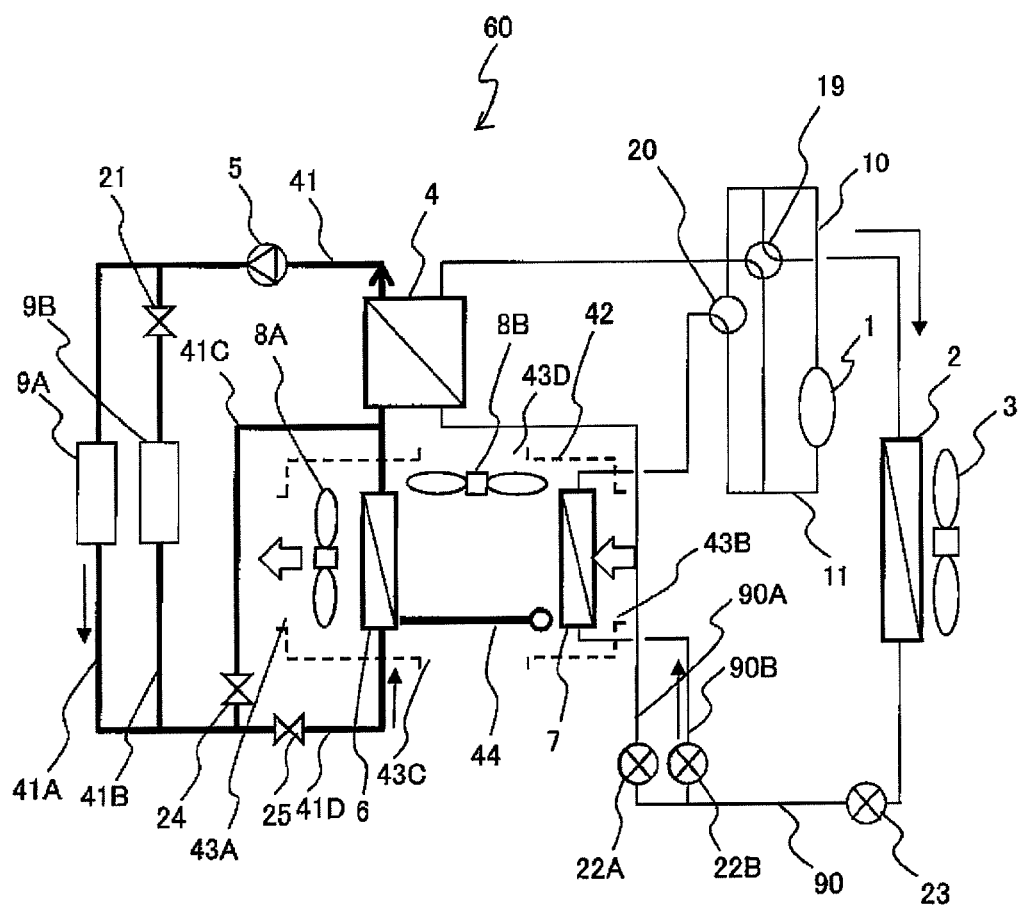
FIG. 8 illustrates the schematic configuration of the air-conditioning apparatus 60 of Example 1 in a dehumidifying operation mode.

A dehumidifying operation is an operation of dehumidifying the inside, and is described using FIG. 8.

In the dehumidifying operation, as illustrated in FIG. 8, the four-way valve 19 and the three-way valve 20 are connected to each other so that the discharge pipe 10 of the compressor 1 is connected to the outdoor heat exchanger 2 and the intake pipe 11 of the compressor 1 is connected to the intermediate heat exchanger 4 and the indoor air-conditioning heat exchanger 7. In addition, the expansion valve 22A is totally closed and the expansion valve 23 is totally opened so as not to cause the air-conditioning cooling medium to flow to the intermediate heat exchanger 4. That is, the outdoor heat exchanger 2 functions as a condenser and the indoor air-conditioning heat exchanger 7 functions as an evaporator.

The air-conditioning cooling medium compressed by the compressor 1 is liquefied by dissipating heat at the outdoor heat exchanger 2, and thereafter flows to the indoor air-conditioning heat exchanger 7 through the totally-opened expansion valve 23. The air-conditioning cooling medium that flows through the indoor air-conditioning heat exchanger 7 is depressurized by the expansion valve 22B to have a low temperature and a low pressure, evaporates by absorbing heat from the air taken into the air inlet and outlet port 43A at the indoor air-conditioning heat exchanger 7, and returns to the compressor 1 through the three-way valve 20.

In the device cooling circuit 41, by opening the two-way valve 25 and closing the two-way valve 24, the device cooling medium flows through the intermediate heat exchanger 4 and the indoor cooling heat exchanger 6 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B.

The switching damper 44 in the indoor unit 42 is set so that air taken into the air inlet and outlet port 43B is blown out from the air inlet and outlet port 43A through the indoor air-conditioning heat exchanger 7 and the indoor cooling heat exchanger 6 as illustrated in FIG. 8. The air blown out from the air inlet and outlet port 43B is dehumidified and cooled through heat exchange at the indoor air-conditioning heat exchanger 7. In addition, since the device cooling medium warmed by the heat generating element 9 is circulated through the indoor cooling heat exchanger 6, the temperature of the air passing through the indoor cooling heat exchanger 6 is increased.

In this manner, a so-called reheating and dehumidifying operation becomes possible. The relative humidity of the air supplied to the vehicle interior is reduced, and thus comfort of the interior space may be enhanced. In addition, the air inlet and outlet port 43A communicates with the inside (vehicle interior) through a duct (not shown) for temperature control of the inside.

In addition, the heat source of the indoor cooling heat exchanger 6 used as a repeater is exhaust heat generated by the heat generating element 9. Therefore, unlike a case of using a heater or the like for reheating, there is no need to newly provide energy. Therefore, it is possible to enhance comfort of the vehicle interior without an increase in power consumption.

In addition, in order to control a reheating amount, the air volume of the indoor fan 8A, the flow rate of the pump 5, the revolutions of the compressor 1, the opening of the expansion valve 22B, and the air volume of the outdoor fan 3 may be controlled. In order to increase the reheating amount, the air volume of the indoor fan 8A may be increased, the flow rate of the pump 5 may be increased, the revolutions of the compressor 1 may be increased, the opening of the expansion valve 22B may be increased, and the air volume of the outdoor fan 3 may be increased.

On the other hand, in order to reduce the reheating amount, the air volume of the indoor fan 8A may be reduced, the flow rate of the pump 5 may be reduced, the revolutions of the compressor 1 may be reduced, the opening of the expansion valve 22B may be reduced, and the air volume of the outdoor fan 3 may be reduced. In addition, not all the actuators need to be controlled, and at least one actuator may be controlled.

(9) Heating and Dehumidifying Operation

Figure 9:
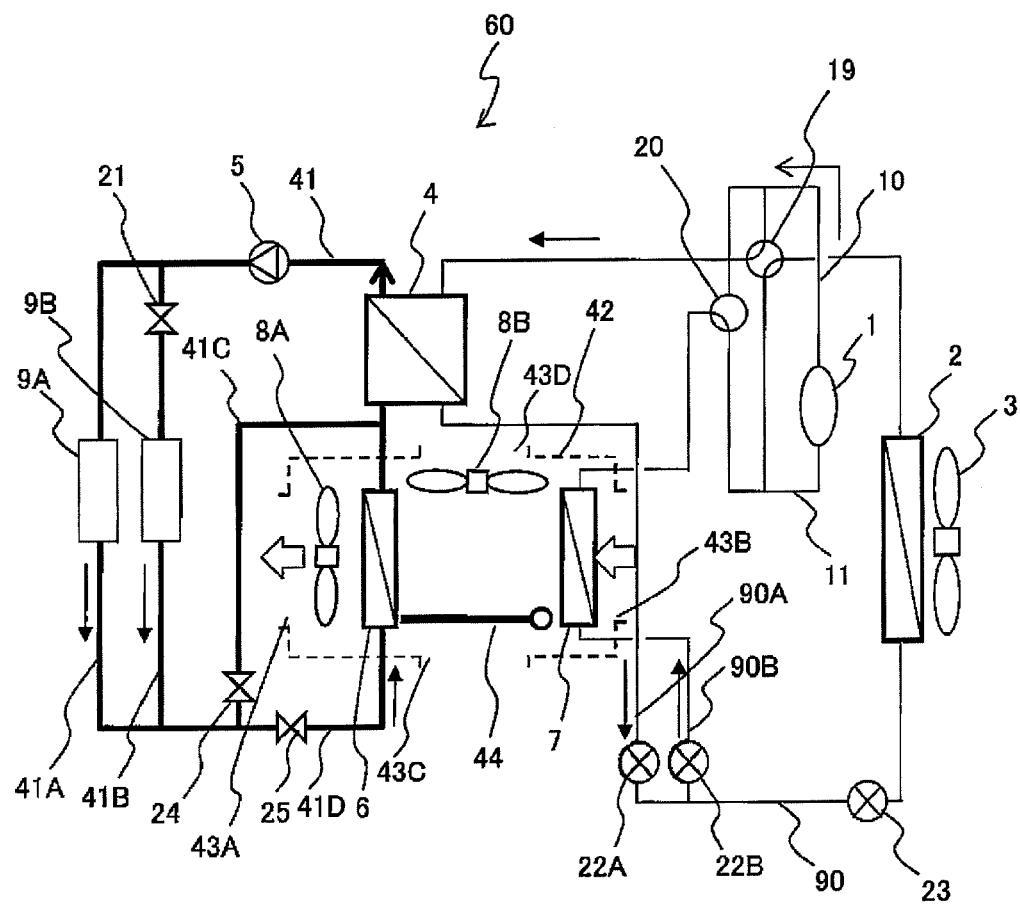
FIG. 9 illustrates the schematic configuration of the air-conditioning apparatus 60 of Example 1 in a heating and dehumidifying operation mode.

A heating and dehumidifying operation is an operation of heating and dehumidifying the inside, and is described using FIG. 9.

In the heating and dehumidifying operation, as illustrated in FIG. 9, the four-way valve 19 and the three-way valve 20 are connected to each other so that the discharge pipe 10 of the compressor 1 is connected to the intermediate heat exchanger 4 and the intake pipe 11 of the compressor 1 is connected to the outdoor heat exchanger 2 and the indoor air-conditioning heat exchanger 7. In addition, the expansion valve 22A is totally opened and the expansion valve 23 is totally closed so as not to cause the air-conditioning cooling medium to flow to the outdoor heat exchanger 2. That is, the intermediate heat exchanger 4 functions as a condenser and the indoor air-conditioning heat exchanger 7 functions as an evaporator.

The air-conditioning cooling medium compressed by the compressor 1 is liquefied by dissipating heat at the intermediate heat exchanger 4, and thereafter flows to the indoor air-conditioning heat exchanger 7 through the totally-opened expansion valve 22A. The air-conditioning cooling medium that flows through the indoor air-conditioning heat exchanger 7 is depressurized by the expansion valve 22B to have a low temperature and a low pressure, evaporates by absorbing heat from the air taken into the air inlet and outlet port 43A at the indoor air-conditioning heat exchanger 7, and returns to the compressor 1 through the three-way valve 20. At the intermediate heat exchanger 4, the device cooling medium is heated through heat exchange between the device cooling medium and the air-conditioning cooling medium.

In the device cooling circuit 41, by opening the two-way valve 25 and closing the two-way valve 24, the device cooling medium flows to the intermediate heat exchanger 4 and the indoor cooling heat exchanger 6 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B. In a case of much use of exhaust heat of the heat generating element 9, the two-way valve 21 may be opened.

The switching damper 44 in the indoor unit 42 is set so that air taken into the air inlet and outlet port 43B is blown out from the air inlet and outlet port 43A through the indoor air-conditioning heat exchanger 7 and the indoor cooling heat exchanger 6 as illustrated in FIG. 9. The air blown out from the air inlet and outlet port 43B is dehumidified and cooled through heat exchange at the indoor air-conditioning heat exchanger 7. In addition, since the device cooling medium warmed by the intermediate heat exchanger 4 and the heat generating element 9 is circulated through the indoor cooling heat exchanger 6, the temperature of the air passing through the indoor cooling heat exchanger 6 is increased. In this manner, the heating and dehumidifying operation becomes possible. In addition, the air inlet and outlet port 43A communicates with the inside (vehicle interior) through a duct (not shown) for temperature control of the inside.

In order to control the temperature of the air blown out from the air inlet and outlet port 43A, the air volume of the indoor fan 8A, the flow rate of the pump 5, the revolutions of the compressor 1, and the opening of the expansion valve 22B may be controlled. In a case where the blown air has a temperature lower than a target temperature, the air volume of the indoor fan 8A may be increased, the flow rate of the pump 5 may be increased, the revolutions of the compressor 1 may be increased, and the opening of the expansion valve 22B may be increased.

On the other hand, in a case where the blown air has a temperature higher than a target temperature, the air volume of the indoor fan 8A may be reduced, the flow rate of the pump 5 may be reduced, the revolutions of the compressor 1 may be reduced, and the opening of the expansion valve 22B may be reduced. In addition, not all the actuators need to be controlled, and at least one actuator may be controlled.

(10) Device Heating Operation

At starting up in the winter season in which the outside air temperature is low, there are cases where it is good to warm the heat generating element 9 in advance. A device heating operation is an operation of warming the heat generating element 9 without performing inside air-conditioning, and is described using FIG. 10.

Figure 10:
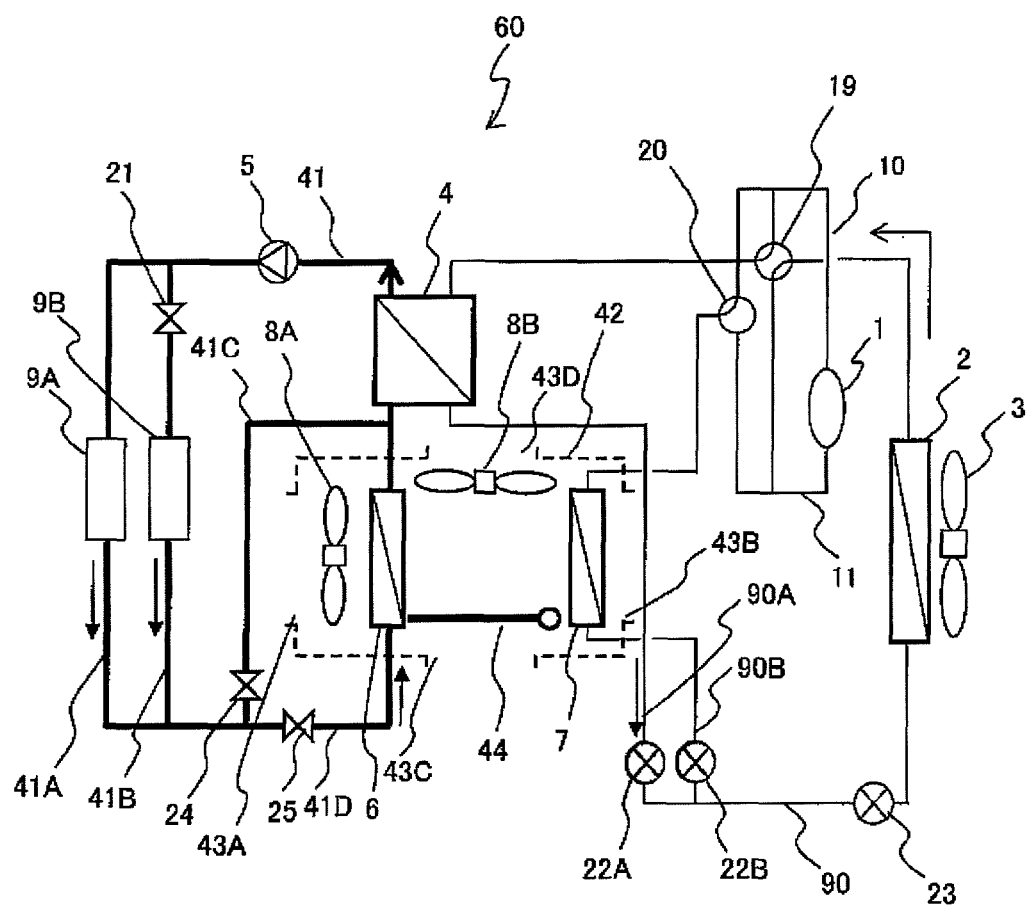
FIG. 10 illustrates the schematic configuration of the air-conditioning apparatus 60 of Example 1 in a heating operation mode.

In the device heating operation, as illustrated in FIG. 10, the four-way valve 19 and the three-way valve 20 are connected to each other so that the discharge pipe 10 of the compressor 1 is connected to the intermediate heat exchanger 4 and the indoor air-conditioning heat exchanger 7 and the intake pipe 11 of the compressor 1 is connected to the outdoor heat exchanger 2. In addition, the expansion valve 22A is totally opened and the expansion valve 22B is totally closed so as not to cause the air-conditioning cooling medium to flow to the indoor air-conditioning heat exchanger 7. That is, the intermediate heat exchanger 4 functions as a condenser and the outdoor heat exchanger 2 functions as an evaporator.

The air-conditioning cooling medium compressed by the compressor 1 is liquefied by dissipating heat at the intermediate heat exchanger 4, and thereafter flows to the outdoor heat exchanger 2 through the totally-opened expansion valve 22A. The air-conditioning cooling medium that flows through the outdoor heat exchanger 2 is depressurized by the expansion valve 23 to have a low temperature and a low pressure, evaporates by absorbing heat from the outside air at the outdoor heat exchanger 2, and returns to the compressor 1. At the intermediate heat exchanger 4, the device cooling medium is heated through heat exchange between the device cooling medium and the air-conditioning cooling medium.

In the device cooling circuit 41, by closing the two-way valve 25 and opening the two-way valve 24, the device cooling medium does not flow to the indoor cooling heat exchanger 6 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B. The two-way valve 21 may be opened to cause the device cooling medium to flow to the heat generating element 9 to be heated.

Since the device cooling medium is heated by the refrigeration cycle circuit 90, the heat generating element 9 may be heated by circulating the device cooling medium.

In the indoor unit 42, taking in and discharge of air are not performed, and the indoor fans 8A and 8B are not driven. In addition, since the device cooling medium and the air-conditioning cooling medium do not flow to the indoor cooling heat exchanger 6 and the indoor air-conditioning heat exchanger 7, respectively, heat exchange is not made.

In addition, in order to control a heating amount, the flow rate of the pump 5, the revolutions of the compressor 1, the opening of the expansion valve 23, and the air volume of the outdoor fan 3 may be controlled. In order to increase the heating amount, the flow rate of the pump 5 may be increased, the revolutions of the compressor 1 may be increased, the opening of the expansion valve 23 may be increased, and the air volume of the outdoor fan 3 may be increased.

On the other hand, in order to reduce the heating amount, the flow rate of the pump 5 may be reduced, the revolutions of the compressor 1 may be reduced, the opening of the expansion valve 23 may be reduced, and the air volume of the outdoor fan 3 may be reduced. In addition, not all the actuators need to be controlled, and at least one actuator may be controlled.

In the heating operation illustrated in FIG. 6 and in the device heating operation illustrated in FIG. 10, frost formation on the outdoor heat exchanger 2 may not be avoided. A defrosting operation is an operation of performing defrosting of the outdoor heat exchanger 2 by temporarily switching from the heating operation and the device heating operation, and is described using FIG. 11.

(11) Defrosting Operation

Figure 11:
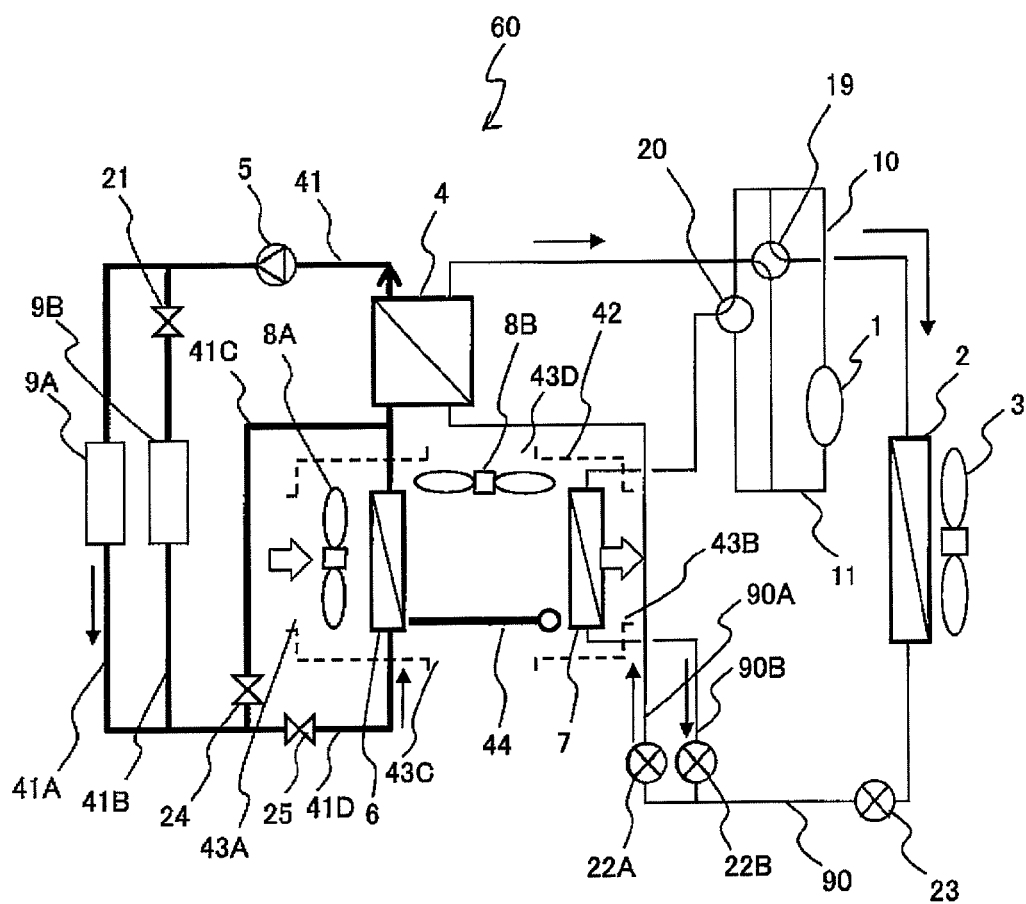
FIG. 11 illustrates the schematic configuration of the air-conditioning apparatus 60 of Example 1 in a defrosting operation mode.

In the defrosting operation, as illustrated in FIG. 11, the four-way valve 19 and the three-way valve 20 are connected to each other so that the discharge pipe 10 of the compressor 1 is connected to the outdoor heat exchanger 2 and the indoor air-conditioning heat exchanger 7 and the intake pipe 11 of the compressor 1 is connected to the intermediate heat exchanger 4. In addition, the expansion valves 23 and 22B are totally opened. That is, the outdoor heat exchanger 2 and the indoor air-conditioning heat exchanger 7 function as condensers and the intermediate heat exchanger 4 functions as an evaporator.

The air-conditioning cooling medium compressed by the compressor 1 is liquefied by dissipating heat at the outdoor heat exchanger 2 and the indoor air-conditioning heat exchanger 7, and thereafter flows to the intermediate heat exchanger 4 through the totally-opened expansion valves 22B and 23. Accordingly, frost formed on the outdoor heat exchanger 2 may be removed. The air-conditioning cooling medium that flows through the intermediate heat exchanger 4 is depressurized by the expansion valve 22A to have a low temperature and a low pressure, evaporates by absorbing heat from the intermediate heat exchanger 4, and returns to the compressor 1. At the intermediate heat exchanger 4, the device cooling medium is cooled through heat exchange between the device cooling medium and the air-conditioning cooling medium.

In the device cooling circuit 41, by closing the two-way valve 25 and opening the two-way valve 24, the device cooling medium does not flow to the indoor cooling heat exchanger 6 by driving of the pump 5. In a case of closing the two-way valve 21, the device cooling medium flows only to the device cooling circuit 41A, and in a case of opening the two-way valve 21, the device cooling medium flows to the device cooling circuits 41A and 41B. Since the device cooling medium is cooled by the refrigeration cycle circuit 90, the heat generating element 9 may be cooled by circulating the device cooling medium.

The switching damper 44 in the indoor unit 42 is set so that air taken into the air inlet and outlet port 43A is blown out from the air inlet and outlet port 43B through the indoor cooling heat exchanger 6 and the indoor air-conditioning heat exchanger 7 as illustrated in FIG. 11. Since the device cooling medium is not circulated through the indoor cooling heat exchanger 6, the temperature of air passing through the indoor cooling heat exchanger 6 does not change.

In addition, the air that is further warmed through heat exchange at the indoor air-conditioning heat exchanger 7 disposed on the downstream side is blown out to the inside from the air inlet and outlet port 43B. As such, the warmed air may be blown out to the inside even in the defrosting operation. In addition, the air inlet and outlet port 43B communicates with the inside (vehicle interior) through a duct (not shown) for temperature control of the inside.

In addition, the warmed air may also not be blown to the inside. In the above-described configuration, the expansion valve 22B may be totally closed, and the indoor fans 8A and 8B may not be driven.

In addition, in order to control a defrosting amount, the air volume of the indoor fan 8A, the flow rate of the pump 5, the revolutions of the compressor 1, the opening of the expansion valve 22A, and the air volume of the outdoor fan 3 may be controlled. In order to increase the defrosting amount, the air volume of the indoor fan 8A may be increased, the flow rate of the pump 5 may be increased, the revolutions of the compressor 1 may be increased, the opening of the expansion valve 22A may be increased, and the air volume of the outdoor fan 3 may be increased. On the other hand, in order to reduce the defrosting amount, the air volume of the indoor fan 8A may be reduced, the flow rate of the pump 5 may be reduced, the revolutions of the compressor 1 may be reduced, the opening of the expansion valve 22A may be reduced, and the air volume of the outdoor fan 3 may be reduced. In addition, not all the actuators need to be controlled, and at least one actuator may be controlled.

(12) Reason to Switch Flow of Air in Indoor Unit 42 According to Operation Modes In the description of the above-mentioned operations, the flow of the air in the indoor unit 42 is switched according to the operation modes. The reason for this will be described.

Figure 12:
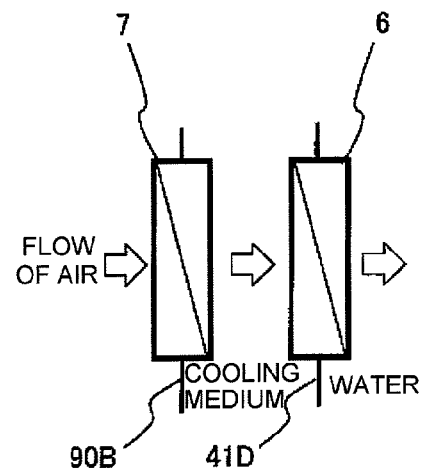
FIG. 12 illustrates the arrangement of an indoor air-conditioning heat exchanger 7 and an indoor cooling heat exchanger 6 according to the present invention.

In a case of performing dehumidification, as illustrated in FIG. 12, the air needs to be warmed by the indoor cooling heat exchanger 6 after cooling and dehumidifying the air at the indoor air-conditioning heat exchanger 7. Here, a case of performing the heating operation using exhaust heat of the heat generating element 9 in the arrangement of the heat exchanger illustrated in FIG. 12 is considered.

As illustrated in FIG. 12, when the air passes through the indoor air-conditioning heat exchanger 7 and the indoor cooling heat exchanger 6 in this order, in a state where the device cooling medium is not sufficiently warmed, the temperature of the air warmed by the indoor air-conditioning heat exchanger 7 is lowered at the indoor cooling heat exchanger 6. In a case where the temperature of the device cooling medium that flows through the indoor cooling heat exchanger 6 is low as such, the two-way valve 24 is opened and the two-way valve 25 is closed so as not to cause the device cooling medium to flow to the indoor cooling heat exchanger 6.

Figure 13:
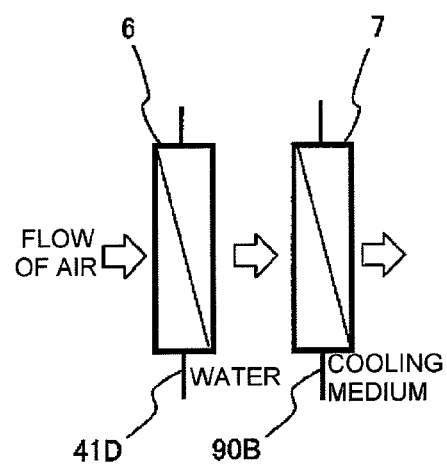
FIG. 13 illustrates the arrangement of an indoor air-conditioning heat exchanger 7 and an indoor cooling heat exchanger 6 according to the present invention.

That is, the heating operation using exhaust heat may not be performed. Considering this, as illustrated in FIG. 13, the air may be caused to pass through the indoor cooling heat exchanger 6 and the indoor air-conditioning heat exchanger 7 in this order. This is because the temperature of the air may further be increased at the indoor air-conditioning heat exchanger 7 after increasing the temperature of the air at the indoor cooling heat exchanger 6 by the device cooling medium. If there is any increase in the temperature of the device cooling medium by the heat generating element 9, the heating operation using exhaust heat becomes possible. Accordingly, it is possible to reduce energy consumption of the air-conditioning system.

In addition, when the air passes as illustrated in FIG. 13, as described above, the dehumidifying operation may not be performed. Therefore, the flow direction of the air is switched according to the operation modes. That is, the air is caused to flow as illustrated in FIG. 12 in the dehumidifying operation and the heating and dehumidifying operation, and the air is caused to flow as illustrated in FIG. 13 in the other operation modes.

In addition, in the case of device cooling as illustrated in FIGS. 3 and 5, and in a case of not warming the inside, the switching damper 44 is provided so as not to cause the warm air subjected to heat exchange at the indoor cooling heat exchanger 6 to enter the vehicle interior.

Next, the air inlet and outlet ports 43A, 43B, 43C, and 43D of the indoor unit 42 illustrated in FIG. 2 will be described. In a case of taking in air, the air inlet and outlet ports 43A, 43B, and 43C are caused to take in air in the inside (inside air) or air outside the vehicle (outside air) through ducts (not shown), and in a case of blowing out air, the air inlet and outlet ports 43A and 43B are caused to blow out air to the inside (vehicle interior) through ducts (not shown). The air blown out to the inside may be switched to the foot, the windshield, or the like by the ducts (not shown). In addition, the air inlet and outlet port 43D is provided with a duct (not shown) so as not to blow out air to the outside (vehicle exterior).

(13) Description of Heat Generating Element

However, the heat generating element 9 provided in the device cooling circuit 41 is a device mounted in the vehicle and is a device of which the temperature needs to be adjusted to be in a predetermined range during vehicle driving. As specific examples of the heat generating element 9, there are a motor 73 for travel driving, an inverter 72 for driving the motor 73, a driving battery 76, a deceleration mechanism (gearbox) provided in a travel driving system, and the like.

In a case of performing temperature control by providing the heat generating element 9 in the device cooling circuit 41, temperature control needs to be performed depending on the temperature characteristics of each of the devices. FIG. 14 is a diagram illustrating conditions of objects of temperature control. As the objects of temperature control, there are the vehicle interior and the heat generating element 9. Regarding the heat generating element 9, the motor 73, the inverter 72, the battery 76, and the gearbox are described.

For air-conditioning of the vehicle interior, cooling, heating, and dehumidifying are appropriately performed on the basis of temperature setting, outside air temperature, and the like. However, as described later, there is a case where cooling is stopped or weakened to cool the heat generating element 9.

The temperatures of the motor 73 and the inverter 72 are generally increased when they output high torques. Therefore, output times of high torques are limited so as not to cause the temperatures to be equal to or higher than predetermined temperatures. The output times of high torques may be extended by enhancing the cooling abilities of the motor 73 and the inverter 72. The temperature of the device cooling medium that is circulated in the motor 73 and the inverter 72 is controlled to be equal to or less than, for example, 60° C.

Regarding the battery 76, in order to sufficiently exhibit the charging and discharging ability thereof, that is, in order to achieve enhancement of the charging and discharging efficiency, it is preferable to maintain the temperature of the battery 76 in a predetermined temperature range. Therefore, in a case where the battery temperature is low (for example, at starting up in a case where the outside air temperature is low), warming up (device heating) is needed, and in a case where the battery temperature increases too high due to heat generation of the battery itself, cooling is needed.

A parallel gear train in the gearbox is in a state of being immersed in a lubricating oil. The viscosity of the lubricating oil in a casing of the gearbox influences a loss during driving, and in a case where the temperature of the lubricating oil is low (during starting up in a case where the outside air temperature is low, and the like), an agitation loss which is a loss when the gear agitates the lubricating oil is increased. Contrary to this, in a case where the temperature of the lubricating oil is too high, oil film formation is not sufficiently performed on the engagement surface of the gear, and a frictional loss is increased. Therefore, at starting up in the winter season and the like, warming up (device heating) is needed, and in the case where the temperature of the lubricating oil is high, heat dissipation from the gearbox needs to be hastened.

(14) Control Flow

In the present invention, as illustrated in FIG. 1, the air-conditioning control apparatus 61 acquires the vehicle driving information 64 (vehicle speed information, accelerator opening information, and the like) and the travel plan information 65, and controls the air-conditioning apparatus 60 on the basis of such information, the temperatures 63 of devices that need temperature control, and the vehicle interior temperature 62. For example, devices that need temperature control and a change in the temperature of the vehicle interior are predicted, and by changing the setting temperatures of the air-conditioning cooling medium and the device cooling medium in advance on the basis of the prediction, cooling and warming up of each of the devices are efficiently performed, and thus the device temperatures are controlled to be optimal.

Figure 15:
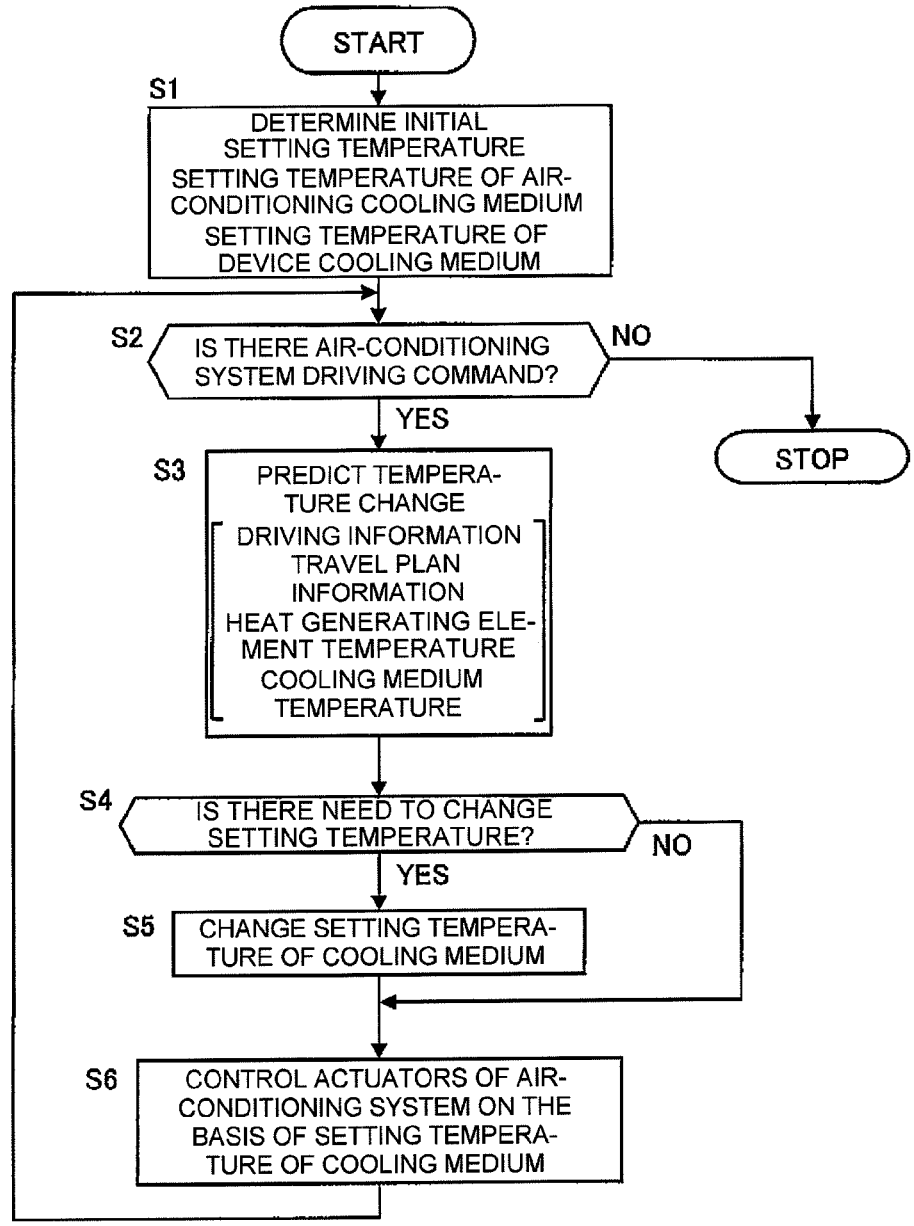
FIG. 15 is a flowchart illustrating a control processing program executed in an air-conditioning control apparatus 61 according to the present invention.

FIG. 15 is a flowchart illustrating a control processing program executed in the air-conditioning control apparatus 61. A microcomputer provided in the air-conditioning control apparatus 61 sequentially executes processes illustrated in FIG. 15 through software processing. In addition, the microcomputer starts the processes of the program illustrated in FIG. 15 when the ignition key switch of the vehicle is turned on.

In Step S1, initial setting temperatures of the air-conditioning cooling medium used for air-conditioning of the vehicle interior and the device cooling medium used for cooling and heating the heat generating element 9 are determined. The initial setting temperatures are set to appropriate temperatures, for example, in a case of assuming room temperature as the outside air temperature and flat road travel at a predetermined speed.

In Step S2, it is determined whether or not there is an air-conditioning system driving command. In a case of a configuration in which driving of the air-conditioning system is turned on and off by ON and OFF of the vehicle, presence of the air-conditioning system driving command is determined by whether or not the vehicle on and off switch is turned on. In Step S2, NO is determined, the program of FIG. 15 is ended. On the other hand, in Step S2, YES is determined, the program proceeds to Step S3.

In Step S3, on the basis of at least one of the vehicle driving information 64, the travel plan information 65, the detection temperature of each of the heat generating elements 9, and the detection temperature of the cooling medium, changes in the temperature of the vehicle interior, each of the heat generating elements 9, the air-conditioning cooling medium, and the device cooling medium, which are the objects of temperature control, are predicted.

In Step S4, on the basis of the prediction of the temperature changes obtained in Step S3, it is determined whether or not there is a need to change the setting temperatures of the air-conditioning cooling medium and device cooling medium.

When it is determined that there is a need to change in Step S4, the program proceeds to Step S5 to change the setting temperatures of the cooling media, and proceeds to Step S6. On the other hand, the prediction temperatures are calculated and it is determined that there is no need to change, the program skips Step S5 and proceeds to Step S6.

In Step S6, in order to change the current temperatures of the cooling media on the basis of the changed setting temperatures, each of the actuators of the air-conditioning apparatus 60 illustrated in FIG. 1 is controlled.

In addition, in the above description, in Steps S4 to S6, the setting temperatures of the cooling media are changed. However, the setting temperatures of the heat generating elements 9 (the vehicle interior, each of the devices) may also be changed.

(15) Change in Setting Temperatures of Heat Generating Elements

Next, vehicle states and changes in the setting temperatures of the heat generating elements 9 which are the devices that need temperature control are described using FIG. 16. The vehicle states are based on detection signals from an accelerator sensor and a vehicle speed sensor as the vehicle driving information 64, and the travel plan information 65 from a navigation apparatus.

In FIG. 16, 9 kinds of vehicle states including during charging, before starting travel, before starting off, acceleration and deceleration and before mountain road travel and during travel, during general road travel, before expressway travel and during travel, before a temporary stop (for example, waiting for a traffic light, congestion, and the like), before a stop, and during a stop are described, but the vehicle states are not limited thereto. In addition, the objects of temperature control are the vehicle interior, the motor, the inverter, the battery, and the gearbox.

From the vehicle driving information 64 (vehicle speed, acceleration opening), the intention of a driver (to accelerate, and the like) may be determined. The travel plan information 65 is information on the road to the destination by the navigation apparatus (congestion states, the gradient of the road) and destination information. The amount of heat generated by the heat generating element 9 is predicted from the output of the motor predicted as above and the output of inside air-conditioning, and the setting temperature of the vehicle interior and the setting temperature of the devices as the objects of temperature control re changed.

For example, in a case where an intention of accelerating may be predicted from the vehicle driving information 64, the setting temperatures of the motor and the inverter are reduced in order to cool the motor and the inverter in advance. In addition, in a case where mountain road travel is predicted from the travel plan information 65, the setting temperatures of the motor and the inverter are reduced to be lower than initial settings. The initial settings are settings on the supposition of general travel on, for example, a flat road. The setting temperature of the battery is not changed, and warming up or cooling is performed by controlling the flow of the device cooling medium so that a predetermined temperature range in which efficient charging and discharging are performed is achieved. The setting temperature of the gearbox is not changed either, and recovery of exhaust heat is performed.

In a case of charging, the setting temperature is not changed, and warming up and cooling are controlled so that the battery temperature during charging is in a predetermined temperature range. Regarding the vehicle interior, the motor, the inverter, and the gearbox, heating and cooling, or cooling and warming up are not performed.

Before starting travel supposes a case where battery charging is performed by an AC power supply during parking of the vehicle. In this case, the vehicle interior is subjected to cooling and heating by the AC power supply in advance so that the temperature of the vehicle interior is in a comfort state at starting travel.

When the vehicle state is before starting, the setting temperatures of all the objects of temperature control are set to states of not change in preparation for travel immediately after the starting, and cooling and warming up of the battery and warming up of the gearbox are performed. As before starting travel and before starting, the battery and the gearbox are warmed up before vehicle travel, thereby achieving enhancement in efficiency during travel.

When the vehicle state is during general road travel, that is, in a standard vehicle state, the setting temperatures of all the objects of temperature control are set to states of no change.

Even when the vehicle state is before expressway travel and during travel, as in the case of mountain road travel, the motor output is increased. Therefore, the same control of the setting temperatures and air-conditioning as that in the case of mountain road travel is performed.

In a temporary stop state such as waiting for a traffic light or during congestion, heating of the motor and the inverter is reduced compared to the travel state, and the temperature is not increased even though a cooling power is lower. Therefore, the cooling power is weakened by increasing the setting temperatures of the motor and the inverter. As a result, energy saving may be achieved. Regarding the setting temperature of the battery, the temperature range is widened.

In a state where a stop is predicted from the travel plan information, such as on arrival at the destination (before a stop), the setting temperatures of the motor, the inverter, and the battery are set as in the case of before a temporary stop. However, since a stop of vehicle driving is predicted, cooling and heating of the vehicle interior and cooling and warming up of the gearbox are stopped in advance, thereby achieving energy saving.

Furthermore, during a stop, cooling and heating of the vehicle interior and cooling and warming up of all the devices as the objects of temperature are stopped.

In addition, in a state where air-conditioning of the vehicle interior and cooling and warming up of each of the devices are performed, in a case where the temperature of each of the devices is close to the upper limit temperature, cooling and warming up of each of the devices are prior to air-conditioning of the vehicle interior.

Under the control of the flowchart of FIG. 15 described above, temperature changes are predicted in Step S3, and the setting temperatures (target temperatures) of the cooling media are changed on the basis of the prediction result. However, the vehicle states illustrated in FIG. 16 may be predicted from the vehicle driving information 64 and the travel plan information 65 and changing the setting temperatures may be directly determined from the prediction result.

(16) Description of EV Control Apparatus

Figure 17:
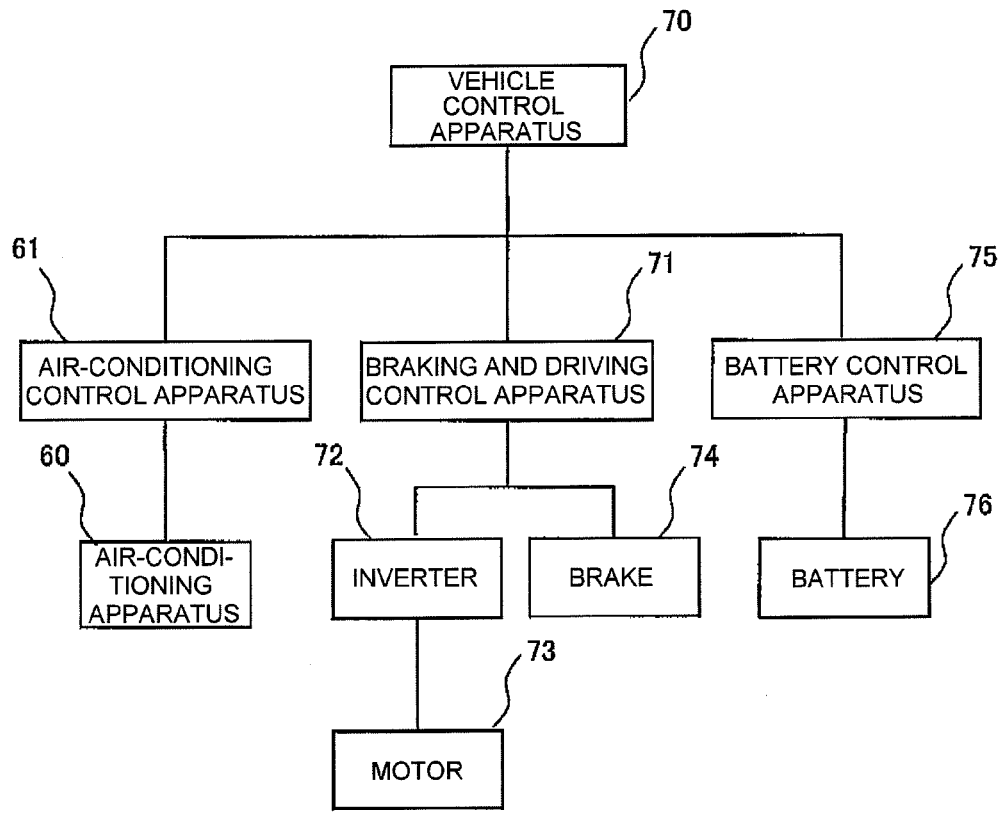
FIG. 17 illustrates the configuration of a control apparatus of an electric vehicle mounted in the vehicular air-conditioning system of the present invention.

Next, a configuration of a control apparatus of an electric vehicle in which the vehicular air-conditioning system of the present invention is mounted is described using FIG. 17. The control apparatus of the electric vehicle includes: a vehicle control apparatus 70 which performs control of the entire vehicle; the air-conditioning control apparatus 61 which performs control of the air-conditioning apparatus 60; a braking and driving control apparatus 71 which controls braking and driving of the motor 73, the inverter 72, and a brake 74; a battery control apparatus 75 which performs power management of the battery 76. In addition, control apparatuses other than those are present, but description thereof will be omitted in this embodiment.

The air-conditioning control apparatus 61 switches the operations of the air-conditioning apparatus 60 illustrated in FIGS. 3 to 11 described above and controls the temperatures of the air-conditioning cooling medium and the device cooling medium illustrated in FIG. 15.

(17) Control of Change in Control Cycle

Figure 18:
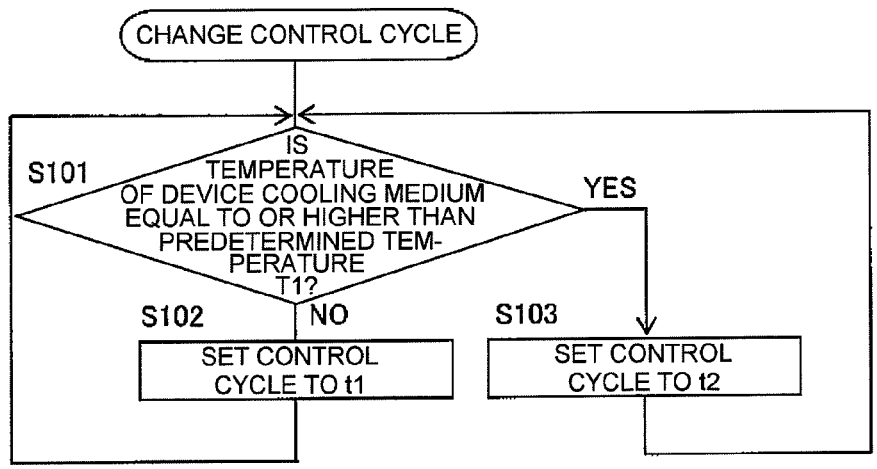
FIG. 18 illustrates a flowchart of a program that executes changing of a control cycle in the air-conditioning control apparatus 61 according to the present invention.

FIG. 18 is a flowchart of a program that executes changing of a control cycle in the air-conditioning control apparatus 61. Typically, the control cycle is set to t1. However, in a case where the temperature of the device cooling medium is equal to or higher than a predetermined temperature T1 in Step S101, the control cycle is maintained at t2 or is changed in Step S103. Here, t2 is smaller than t1. In a case where the temperature of the device cooling medium is smaller than the predetermined temperature T1 in Step S101, the control cycle is maintained at t1 or is changed in Step S102.

As described above, in cases where the device cooling operation, the cooling and device cooling operation, and the heating and device cooling operation are performed while the temperature of the device cooling medium is increased, the control cycle of the air-conditioning control apparatus 61 is shortened. In order to reduce the change in the temperature of the vehicle interior and achieve an increase in life-span by reducing the number of operations of the devices including the compressor 1 and the expansion valves 22A, 22B, and 23, the control cycle of the air-conditioning control apparatus 61 may be long.

On the other hand, in the case where the motor 73 and the inverter 72 output high torques as described above, the temperature of the device cooling medium may be rapidly increased. Here, in the case of device cooling as illustrated in FIG. 18, by shortening the control cycle of the air-conditioning control apparatus 61, a rapid increase in the temperature of the device cooling medium is suppressed.

A temperature increase in the device cooling medium in the control cycle t1 is predicted, and the predetermined temperature T1 in Step S101 is set to be lower than the upper limit temperature of the device cooling medium by the temperature increase. The temperature increase in the control cycle t1 is obtained from the heat capacity of the device cooling circuit and the amount of heat generated by the heat generating element 9. In a case where the heat capacity of the device cooling circuit is low and the amount of heat generated by the heat generating element 9 is high, the temperature increase is increased. In addition, the predetermined temperature T1 may be a fixed value determined in advance or may also be changed by amounts of heat generated and the like of the devices that change during driving of the vehicular air-conditioning system.

In addition, in the above example, the control cycle is changed. However, in a case of cooling the devices, the acceleration and deceleration time of the compressor 1 may be set to be shorter than a typical time.

(18) High-Torque Operation Determination Control of Motor

Figure 19:
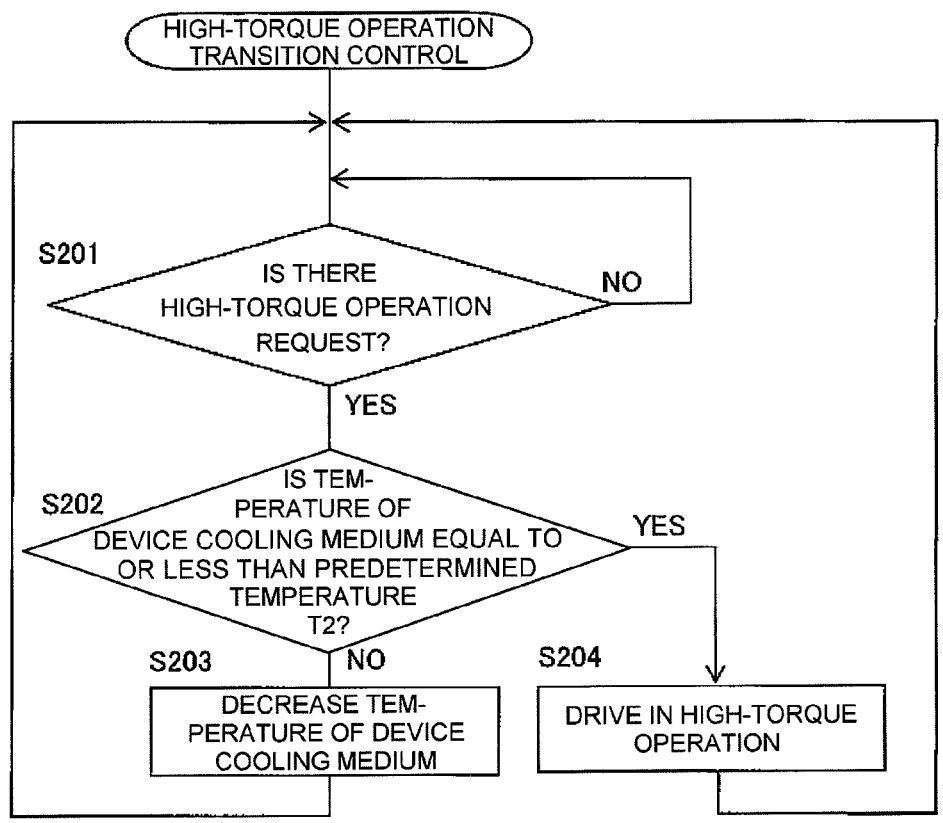
FIG. 19 illustrates a flowchart of a program that determines whether or not a motor 73 according to the present invention is subjected to a high-torque operation.

FIG. 19 is a flowchart of a program that determines whether or not the motor 73 is subjected to a high-torque operation.

In Step S201, it is determined whether or not there is a request of the motor 73 for a high-torque operation. In a case where there is a request for the high-torque operation in Step S201, it is determined whether or not the temperature of the device cooling medium is equal to or less than the predetermined temperature T2 in Step S202. In a case where there is no request for the high-torque operation in Step S201, the program waits for a request for the high-torque operation in Step S201.

In Step S202, in a case where the temperature of the device cooling medium is equal to or less than the predetermined temperature T2, the high-torque operation of the motor 73 is performed in Step S204. In Step S202, in a case where the temperature of the device cooling medium is higher than the predetermined temperature T2, a device cooling operation is performed until the device cooling medium has the predetermined temperature T2 or less in Step 203.

The predetermined temperature T2 in Step S202 is lower than T1, and is determined from the output torque of the motor 73 and the high-torque operation time. As the operation time is longer at the same high torque, the predetermined temperature T2 is reduced.

As described above, since whether or not the motor 73 is subjected to the high-torque operation is determined by the temperature of the device cooling medium, damage of the motor 73 or the inverter 72 may be prevented.

(19) Driving Control of Compressor

Figure 20:
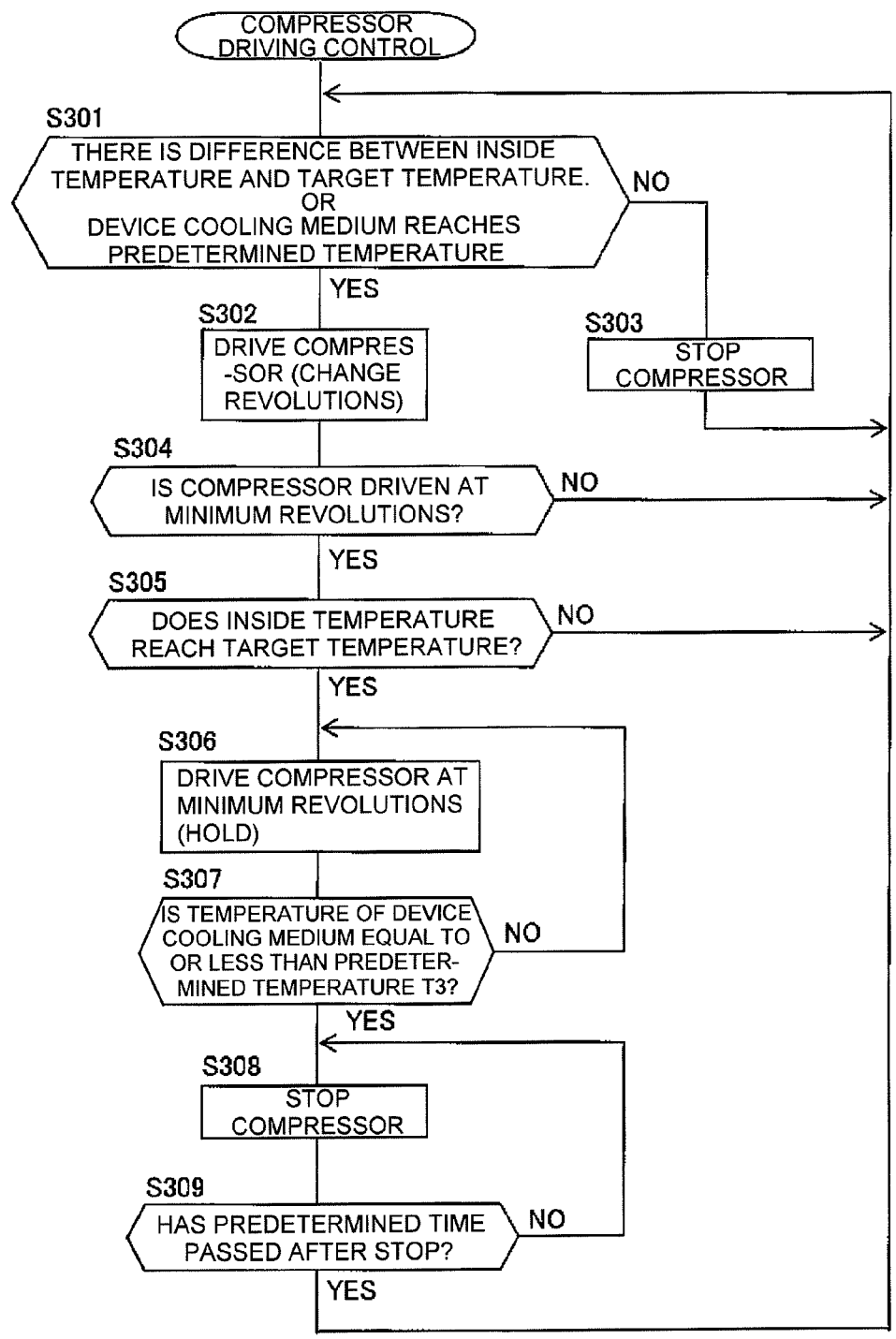
FIG. 20 illustrates a flowchart of driving control of a compressor according to the present invention.

FIG. 20 is a flowchart of driving control of the compressor 1. Control illustrated in FIG. 20 represents only parts to perform driving and stopping of the compressor 1. Control of the revolutions of the compressor 1 is separately performed along with control of the openings of the expansion valves 22A, 22B, and 23.

In Step S301, it is determined whether or not there is a difference between the inside temperature and an inside target temperature or whether or not the device cooling medium reaches an upper limit temperature. In Step S301, in a case where there is a difference between the inside temperature and the inside target temperature or the device cooling medium reaches the upper limit temperature, the compressor 1 is driven in Step S302. The revolutions of the compressor 1 are determined by the difference between the inside temperature and the inside target temperature and the difference between the temperature of the device cooling medium and the upper limit temperature.

In Step S301, in a case where there is no difference between the inside temperature and the inside target temperature or the device cooling medium does not reach the upper limit temperature, the compressor 1 is stopped or maintained in the stopped state in Step S303.

The compressor 1 is driven in Step S302, and it is determined whether or not the compressor 1 is driven at the minimum revolutions in Step S304. In a case where the compressor 1 is not driven at the minimum revolutions in Step S304, the program returns to Step S301, and in a case of driving at the minimum revolutions, it is determined whether or not the inside temperature reaches a target temperature in Step S305.

In a case where the inside temperature does not reach the target temperature in Step S305, the program returns to Step S301, and in a case of reaching the target temperature, the compressor 1 is continuously driven at the minimum revolutions in Step S306. In addition, it is determined whether or not the temperature of the device cooling medium is equal to or less than a predetermined temperature T3 in Step S307.

In a case where the temperature of the device cooling medium is higher than the predetermined temperature T3 in Step S307, the program returns to Step S306, and in a case of the predetermined temperature T3 or less, the compressor 1 is stopped in Step S308. In addition, determination of whether or not a predetermined time has passed after stopping the compressor 1 is performed in Step S309. In a case where the predetermined time has not passed after the stop in Step S309, the program returns to Step S308, and the stopped state of the compressor 1 is maintained. In a case where the predetermined time has passed after stopping the compressor 1 in Step S309, the program returns to Step S301.

The compressor may not be restarted for a predetermined time in terms of device protection in the case of being stopped from the driven state. Driving control of the compressor 1 of FIG. 20 is control corresponding to this. In addition, in order to suppress an increase in the temperature of the device cooling medium during the stop of the compressor 1, the compressor 1 is stopped after the temperature of the device cooling medium is reduced to T3. The predetermined temperature T3 is lower than the upper limit temperature, and is equal to or greater than an outside air temperature for dew condensation prevention. In addition, the amount of heat generated by the device may be predicted on the basis of the travel plan information 65 such as the road information and the destination information, and the temperature T3 of the device cooling medium may be obtained on the basis of the amount of heat generated. That is, T3 is obtained from the predicted temperature of the device cooling medium after passing the predetermined time in Step S309.

In addition, although not illustrated in FIG. 20, in a case where the device cooling medium exceeds the upper limit temperature during the stop of the compressor 1, the output of the motor 73 is limited.

A time after the stop in Step S309 is measured even during a stop of the vehicle (ignition OFF), and thus the compressor 1 may be protected even at restarting the vehicle.

The above-described embodiments may be used singly or in combinations. This is because the effects of the embodiments may be exhibited singly or synergized. In addition, the present invention is not limited to the above embodiments as long as the features of the present invention are not harmed.

REFERENCE SIGNS LIST

1: compressor, 2: outdoor heat exchanger, 3: outdoor fan, 4: intermediate heat exchanger, 5: circulation pump, 6, 6A, 6B: indoor cooling heat exchanger, 7: indoor air-conditioning heat exchanger, 8, 54: indoor fan, 9 (9A, 9B): heat generating element, 10: discharge pipe, 11: intake pipe, 19: four-way valve, 20: three-way valve, 21, 24, 25: two-way valve, 22A, 22B, 23: expansion valve, 41, 41A, 41B, 41C, 41D, 50, 51: device cooling circuit, 42: indoor unit, 43A, 43B, 43C, 43D: air inlet and outlet port, 44, 52, 53: switching damper, 55, 56: intake port, 57, 58: discharge port, 60: air-conditioning apparatus, 61: air-conditioning control apparatus, 62: vehicle interior temperature, 63: temperature of device that need temperature control, 64: vehicle driving information, 65: travel plan information, 70: vehicle control apparatus, 71: braking and driving control apparatus, 72: inverter, 73: motor, 74: brake, 75: battery control apparatus, 76: battery, 90, 90A, 90B: refrigeration cycle circuit.

The invention claimed is:

1. A vehicular air-conditioning system comprising:
a vehicle interior air-conditioning apparatus which includes a device cooling circuit of a heat generating device mounted in a vehicle, and a refrigeration cycle circuit; and
an intermediate heat exchanger for heat exchange between a device cooling medium of the device cooling circuit and an air-conditioning cooling medium of the refrigeration cycle circuit,
an air-conditioning control apparatus configured to control the vehicle interior air-conditioning apparatus according to a first control cycle timing or a second control cycle timing, the second control cycle timing being shorter than the first control cycle timing; and
a vehicle control apparatus electronically connected to the air-conditioning control apparatus and at least one temperature sensor, the vehicle control apparatus configured to:
   determine that an operation in which a temperature of the device cooling medium is increased is to be performed by the vehicle air-conditioning apparatus,
   predict a temperature increase of the device cooling medium due to the operation,
   set a first predetermined temperature based on the predicted temperature increase,
   measure a temperature of the device cooling medium via the at least one temperature sensor;
   perform a comparison of the temperature of the device cooling medium and the first predetermined temperature;
   select the first control cycle timing or the second control timing based on the comparison, and
   control the air-conditioning control apparatus to perform the operation according to a selected timing.

2. The vehicular air-conditioning system according to claim 1, wherein the predicted temperature increase is determined based on the heat capacity of the device cooling circuit and the amount of heat generated by the heat generating device.

3. The vehicular air-conditioning system according to claim 1, wherein the first predetermined temperature is less than the sum of the temperature of the cooling medium and the predicted temperature increase.

4. The vehicular air-conditioning system according to claim 3, wherein the vehicle control apparatus is configured to select the first control cycle timing when the temperature of the cooling medium is less than the first predetermined temperature, and to select the second control cycle timing when the temperature of the cooling medium is greater than the first predetermined temperature.

* * * * *